US012504230B2

(12) United States Patent
Iglauer-Angrik et al.

(10) Patent No.: US 12,504,230 B2
(45) Date of Patent: Dec. 23, 2025

(54) TEMPERATURE TREATMENT SYSTEM

(71) Applicant: Dürr Systems AG, Bietigheim-Bissingen (DE)

(72) Inventors: Oliver Iglauer-Angrik, Stuttgart (DE); Kevin Woll, Heilbronn (DE); Heiko Dieter, Besigheim (DE); Frank Schöttle, Gerlingen (DE); Roman Hahn, Freudental (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 542 days.

(21) Appl. No.: 17/797,373

(22) PCT Filed: Feb. 9, 2021

(86) PCT No.: PCT/DE2021/100127

§ 371 (c)(1),
(2) Date: Aug. 3, 2022

(87) PCT Pub. No.: WO2021/160218

PCT Pub. Date: Aug. 19, 2021

(65) Prior Publication Data

US 2023/0055615 A1 Feb. 23, 2023
US 2024/0353175 A2 Oct. 24, 2024

(30) Foreign Application Priority Data

Feb. 11, 2020 (DE) ......................... 102020201705.0

(51) Int. Cl.

*F26B 21/00* (2006.01)
*F26B 15/12* (2006.01)
*F26B 25/12* (2006.01)

(52) U.S. Cl.

CPC ............ *F26B 21/004* (2013.01); *F26B 15/12* (2013.01); *F26B 25/12* (2013.01); *F26B 2210/12* (2013.01)

(58) Field of Classification Search

CPC .......... F26B 1/004; F26B 15/12; F26B 25/12; F26B 2210/12

(Continued)

(56) References Cited

U.S. PATENT DOCUMENTS 2,140,337 A * 12/1938 Somes .................... F26B 15/00 34/233
4,656,758 A 4/1987 Nakayama (Continued)

FOREIGN PATENT DOCUMENTS

CN 2555486 6/2003
DE 102008012792 9/2009

(Continued)

OTHER PUBLICATIONS

International Searching Authority, "International Search Report and Written Opinion," issued in connection with International Patent Application No. PCT/DE2021/100127, mailed on Aug. 11, 2021, 41 pages.

(Continued)

*Primary Examiner* — Stephen M Gravini
(74) *Attorney, Agent, or Firm* — Hanley, Flight & Zimmerman, LLC

(57) ABSTRACT

The present invention relates to an annealing system which can be used to anneal workpieces, for example vehicle bodies. According to the invention, an annealing chamber, a feed air system, an exhaust air system and one or more air circulation systems are provided.

17 Claims, 18 Drawing Sheets

(58) Field of Classification Search
USPC ........................................................... 34/84
See application file for complete search history.

(56) References Cited

U.S. PATENT DOCUMENTS

| | | | | |
|---|---|---|---|---|
| 4,761,894 | A | 8/1988 | Hamasaki et al. | |
| 5,568,692 | A * | 10/1996 | Crompton | F26B 23/10 392/416 |
| 5,661,912 | A * | 9/1997 | Bhatnagar | F26B 3/283 34/267 |
| 5,868,562 | A | 2/1999 | Watanabe et al. | |
| 6,935,052 | B2 * | 8/2005 | Sonner | F26B 21/002 34/233 |
| 9,500,408 | B2 * | 11/2016 | Spangler | F26B 15/12 |
| 10,605,529 | B2 * | 3/2020 | Wieland | F26B 15/14 |
| 10,697,702 | B2 * | 6/2020 | Iglauer | F26B 15/12 |
| 11,226,157 | B2 * | 1/2022 | Goto | B05C 13/02 |
| 11,235,737 | B2 * | 2/2022 | Moll | F26B 21/10 |
| 12,085,335 | B2 * | 9/2024 | Lin | F26B 13/002 |
| 12,180,605 | B2 * | 12/2024 | Kato | F26B 25/006 |
| 2002/0148137 | A1 | 10/2002 | Eisenacher et al. | |
| 2004/0237339 | A1 | 12/2004 | Sonner et al. | |
| 2006/0055091 | A1 | 3/2006 | Doll | |
| 2011/0023314 | A1 | 2/2011 | Schwerer et al. | |
| 2012/0102780 | A1 | 5/2012 | Bruischat | |
| 2020/0141649 | A1 | 5/2020 | Luz et al. | |
| 2023/0055615 | A1 * | 2/2023 | Iglauer-Angrik | F26B 15/12 |
| 2024/0353175 | A2 * | 10/2024 | Iglauer-Angrik | F26B 21/004 |

FOREIGN PATENT DOCUMENTS

| | | | | |
|---|---|---|---|---|
| DE | 102008012792 | A1 | 9/2009 | |
| DE | 102017110273 | A1 | 11/2018 | |
| DE | 102018115234 | A1 | 1/2020 | |
| DE | 102020201705 | A1 * | 8/2021 | F26B 15/12 |
| EP | 1080788 | | 3/2001 | |
| EP | 1146305 | A1 | 10/2001 | |
| EP | 1602413 | | 12/2005 | |
| GB | 580667 | | 9/1946 | |
| JP | 2011088052 | | 5/2011 | |
| JP | 6749460 | B1 * | 9/2020 | B05D 3/0254 |
| WO | 2004/010066 | A1 | 1/2004 | |
| WO | 2004010066 | | 1/2004 | |
| WO | WO-2018206617 | A1 * | 11/2018 | C21D 11/00 |
| WO | WO-2021160218 | A2 * | 8/2021 | F26B 15/12 |

OTHER PUBLICATIONS

European Patent Office, "Communication Pursuant to Article 94(3) EPC," issued in connection with European Patent Application No. 21707154.7, dated May 22, 2025, 14 pages. [English machine translation included.].

* cited by examiner

TEMPERATURE TREATMENT SYSTEM

RELATED APPLICATION

This application is a national phase of international application No. PCT/DE2021/100127 filed on Feb. 9, 2021 and claims the benefit of German application No. 10 2020 201 705.0 filed on Feb. 11, 2020, which are incorporated herein by reference in their entirety and for all purposes.

FIELD OF DISCLOSURE

The present invention relates to a temperature treatment system for carrying out a temperature treatment of workpieces, in particular for heating and/or cooling vehicle bodies.

BACKGROUND

Temperature treatment systems have, for example, a temperature treatment chamber through which the workpieces can be conveyed along a conveying direction. In addition, a feed air system for supplying feed air to the temperature treatment chamber, an exhaust air system for discharging exhaust air from the temperature treatment chamber, and one or more air circulation systems for circulating at least some of the air guided in the temperature treatment chamber are usually provided.

For reasons of energy efficiency, the feed air system and the exhaust air system are usually coupled to one another, in particular in order to be able to transmit heat from the exhaust air to the feed air. However, it can be disadvantageous here that an elaborate channel system and/or a large space requirement is necessary.

SUMMARY OF THE INVENTION

The problem addressed by the present invention is that of providing a temperature treatment system which has a reduced installation outlay and a smaller space requirement.

This problem is solved according to the invention by a temperature treatment system according to claim 1.

The temperature treatment system for treating workpieces is in particular a temperature treatment system for heating and/or cooling vehicle bodies.

The temperature treatment system preferably comprises a temperature treatment chamber through which the workpieces can be conveyed along a conveying direction.

Furthermore, the temperature treatment system preferably comprises a feed air system for supplying feed air to the temperature treatment chamber, and/or an exhaust air system for discharging exhaust air from the temperature treatment chamber.

It may be favorable if the temperature treatment system comprises one or more air circulation systems for circulating at least some of the air guided in the temperature treatment chamber.

Reduced installation outlay and/or a reduced space requirement can arise, for example, when the feed air system and the exhaust air system are arranged spatially separate from one another.

For example, it can be provided that the feed air system and the exhaust air system are spaced apart from one another along the conveying direction.

In this case, the feed air system and the exhaust air system preferably do not have any components that overlap along the conveying direction or are otherwise in direct spatial connection or operatively connected.

It may be favorable if the feed air system and the exhaust air system have fans that in particular are different from one another and/or can be operated independently of one another.

It may be favorable if one or more air circulation systems are arranged in relation to the conveying direction between the feed air system on the one hand and the exhaust air system on the other hand.

The one or more air circulation systems are arranged in particular along the conveying direction between the feed air system and the exhaust air system.

In particular, the feed air system and the exhaust air system are arranged at opposite ends of the temperature treatment chamber.

By means of the one or more air circulation systems, air can in particular be removed from the temperature treatment chamber and guided back into the temperature treatment chamber, at least in part. For this purpose, the one or more air circulation systems in particular each comprise one or more fans, which are designed in particular as cascade fans.

The one or more air circulation systems do not necessarily serve to guide the air in a closed circuit. Instead, "circulating" is preferably understood to mean any type of air discharge from the temperature treatment chamber and renewed air supply to the temperature treatment chamber, in particular even if the air discharge and the air supply take place at different points along the conveying direction.

It can be advantageous if the feed air system, the exhaust air system and the one or more air circulation systems are each associated with different temperature treatment chamber portions of the temperature treatment chamber, in particular with regard to the respective air supply and/or air discharge.

In particular, the temperature treatment system comprises a plurality of temperature treatment system portions which follow one another along the conveying direction and are formed in particular by temperature treatment system modules.

Preferably, each temperature treatment system portion is associated with exactly one or more temperature treatment chamber portions.

Furthermore, it can be provided that each temperature treatment system portion forms or comprises exactly one or more temperature treatment chamber portions.

Each temperature treatment system portion is preferably associated with exactly one feed air system, exactly one exhaust air system and/or exactly one air circulation system.

Furthermore, it can be provided that a plurality of temperature treatment system portions are in each case jointly associated with exclusively one feed air system or exclusively one exhaust air system or exclusively one air circulation system.

It can be advantageous if the feed air system, the exhaust air system and the one or more air circulation systems each comprise one or more fans, in particular for driving an air flow.

The feed air system, the exhaust air system and the one or more air circulation systems preferably each comprise mutually independent channels and/or passages for connecting these to the temperature treatment chamber.

It may be favorable if the feed air system and the exhaust air system are connected to one another by means of a return channel, the return channel extending in particular past one or more air circulation systems.

By means of the return channel, exhaust air from the exhaust air system can in particular be admixed to the feed air in the feed air system, as required. In particular, an adjustable, controllable and/or regulable portion of the exhaust air can be fed into the feed air system via the return channel.

Alternatively or in addition to the admixing of exhaust air to the feed air, it can be provided that unconditioned or conditioned hall air and/or hot air from a heating device, for example fresh air from a clean gas-heated fresh air heat exchanger, is fed to the feed air. Hot air can further be provided, for example, by means of a hot water register or another heating device, for example a thermal exhaust air cleaning device.

It may be favorable if a fresh air heat exchanger is oversized such that it can condition more than just one gas volume flow required for a dryer portion of the temperature treatment chamber, so that in particular a partial volume flow of a gas volume flow conditioned overall by the fresh air heat exchanger, in particular in the form of hot fresh air, can be fed to a cooling portion of the temperature treatment chamber. One or more heat exchangers, which would in particular be assigned to the cooling portion of the temperature treatment chamber, are thereby preferably dispensable.

The feed air system, the exhaust air system and/or one or more air circulation systems are preferably arranged laterally next to the temperature treatment chamber and/or so as to adjoin the temperature treatment chamber or to a housing surrounding the temperature treatment chamber in the horizontal direction.

The feed air system, the exhaust air system and/or the one or more air circulation systems preferably directly adjoin a housing wall of a housing of the temperature treatment chamber or are integrated into the housing of the temperature treatment chamber.

In particular, it can be provided that the feed air system, the exhaust air system and/or the one or more air circulation systems directly adjoin the housing on an outer side, in particular an outer wall, of a housing surrounding the temperature treatment chamber.

By means of an opening in the housing wall, a fluid connection is or can then preferably be established between the feed air system, the exhaust air system or the one or more air circulation systems on the one hand and an interior of the housing, in particular the temperature treatment chamber.

The feed air system, the exhaust air system and/or the one or more air circulation systems preferably rest substantially completely on a base on which the housing which surrounds the temperature treatment chamber also rests. A separate carrying structure for receiving the feed air system, the exhaust air system and/or the one or more air circulation systems is then preferably dispensable.

It may be favorable if air from at least one temperature treatment chamber portion can be discharged from the temperature treatment chamber by means of one or more air circulation systems and supplied to one or more further temperature treatment chamber portions, in particular upstream or downstream temperature treatment chamber portions in the conveying direction.

By means of one or more air circulation systems, in particular air can be extracted in a base region of at least one temperature treatment chamber portion.

It can be advantageous if air can be supplied in each case in a ceiling region of an interior surrounded by the housing, in particular to one or more pressure chambers, by means of one or more air circulation systems.

It can be advantageous if a plurality of filter stages are provided for the filtration of the feed air and/or the circulating air.

Preferably, at least one first filter stage is integrated into the feed air system and/or the air circulation system or is arranged in the feed air system and/or the air circulation system.

At least one second filter stage is preferably arranged within a housing surrounding the temperature treatment chamber.

The at least one second filter stage is in particular a filter stage close to the nozzle, which filter stage is arranged in particular upstream in relation to a flow direction of the air, and thus upstream of one or more nozzles for supplying air to the temperature treatment chamber.

The at least one first filter stage is preferably a coarse filter stage which, for example, complies with at most filter class D4. In particular, a large air throughput with a low pressure loss can hereby be realized, in particular when the size of the at least one first filter stage is limited due to the spatial conditions.

The at least one second filter stage is preferably a fine filter stage, which in particular is of filter class F5 or finer. As a result, in particular impurities which have passed through the at least one first filter stage can be removed from the air flow.

The at least one second filter stage is in particular arranged within the housing surrounding the temperature treatment chamber and is formed, for example, by a plurality of filter mats. The at least one second filter stage can thereby preferably be formed over a large area, so that the finer filter class also generates a preferably low pressure loss.

The at least one second filter stage is arranged in particular between the at least one pressure chamber and the temperature treatment chamber.

Alternatively, it can also be provided that one or more, in particular all, filter stages are arranged exclusively within the housing surrounding the temperature treatment chamber. This one filter stage or these multiple filter stages then preferably have individual or a plurality of or all features of a filter stage designated as a “first filter stage” and/or individual or a plurality of or all features of a filter stage designated as a “second filter stage”.

It can be advantageous if the feed air system, the exhaust air system and/or the one or more air circulation systems are arranged on one side, on or in a side wall of a housing of the temperature treatment chamber.

In particular, it can be provided that the feed air system, the exhaust air system and/or the one or more air circulation systems are arranged on or in the same side wall of the housing of the temperature treatment chamber.

Only one or more distributor channels of the feed air system, the exhaust air system and/or the one or more air circulation systems preferably run over the temperature treatment chamber, in particular above the housing or inside the housing.

The temperature treatment chamber is or forms in particular a temperature treatment tunnel.

It may be favorable if a feed air channel for sucking in feed air, and/or an exhaust air channel for discharging exhaust air, is/are designed as a ventilation tower, the respective ventilation tower resting on a base and/or extending vertically upward starting from a base, in particular free of flow diversions and/or free of supporting structures, preferably free of external and/or separate supporting structures.

It can be advantageous if one ventilation tower or both ventilation towers each have at least one lateral access opening, in particular a flap. A portion of the respective ventilation tower having the access opening is then preferably reinforced by means of a reinforcing structure. The reinforcing structure can in particular be an insertable or plug-in stiffening ring. Such a reinforcing structure makes it possible, in particular, to dispense with additional, in particular external supporting structures or carrying structures for stabilizing the respective ventilation tower.

It can be provided that the temperature treatment system comprises a conveying device by means of which the workpieces can be conveyed through the temperature treatment chamber in a longitudinal orientation thereof.

Alternatively, it can be provided that the temperature treatment system comprises a conveying device by means of which the workpieces can be conveyed through the temperature treatment chamber in a transverse orientation thereof.

A longitudinal orientation is in particular an orientation of the workpieces such that a workpiece longitudinal axis, for example a longitudinal axis of the vehicle, is oriented parallel to the conveying direction during the conveying of the workpieces along the conveying direction.

In the transverse orientation, a longitudinal axis of the workpiece is oriented, during conveying thereof, preferably transversely to the conveying direction, in particular perpendicularly to the conveying direction.

Both in the longitudinal orientation and in the transverse orientation, the longitudinal axis of the workpiece is preferably oriented horizontally or encloses an angle of at most approximately 30°, preferably at most approximately 10°, with the horizontal.

It can also be provided for a pressure chamber to be formed in each case on both sides of the temperature treatment chamber, via which pressure chamber the air can be introduced into the temperature treatment chamber. The two pressure chambers are preferably fluidically connected to one another by means of a connection channel and/or connection space.

It may be favorable if the connection channel and/or the connection space is arranged within a housing which surrounds the temperature treatment chamber. An arrangement provided outside the housing is also conceivable.

In particular when the temperature treatment system is to have a total length along the conveying direction that is as short as possible, it can be provided that the axis of rotation of one or more fans of the feed air system, the exhaust air system and/or the one or more air circulation systems is/are oriented perpendicular to the conveying direction. In particular, a removal space extending laterally away from the temperature treatment system can hereby be used for maintenance purposes.

Furthermore, an orientation of the axis of rotation of the one or more fans extending parallel to the conveying direction can be selected in particular in the case of larger spacings of the feed air system, the exhaust air system and/or the one or more air circulation systems. As a result, in particular a space required for maintenance purposes on one or both sides of the temperature treatment system can be minimized.

Due to the optimized arrangement and/or configuration of the feed air system, the exhaust air system and/or the one or more air circulation systems, it is possible in particular to dispense with a separate carrying structure, in particular a steel construction, for this purpose. In addition, a high degree of pre-assembly can thereby preferably be achieved. Furthermore, the temperature treatment system can thereby preferably be realized cost-effectively and with little effort.

According to an advantageous combination of features, it is provided that in each case one pressure chamber is formed on either side of the temperature treatment chamber, via which pressure chamber the air can be introduced into the temperature treatment chamber, the two pressure chambers being fluidically connected to one another by means of a connection channel and/or connection space, the connection channel and/or the connection space being arranged within a housing which surrounds the temperature treatment chamber.

Such an embodiment can be advantageous in particular when the temperature treatment system is a temperature treatment system for heating vehicle bodies.

The one or more air circulation systems then are or comprise in particular heating systems for heating the air.

Alternatively or in addition, the one or more air circulation systems can also be or comprise cooling systems for cooling the air.

In particular, one or more heat exchangers for heating or cooling the air circulated by means of the one or more air circulation systems can be provided.

It can be advantageous if the housing is substantially cuboid.

The housing preferably comprises an outer wall which, at least in portions, forms or comprises a thermal insulation region, in particular for thermal insulation of an interior of the housing from the surroundings thereof.

Preferably, the connection channel and/or the connection space is arranged completely within an interior of the housing surrounded by the outer wall, in particular thermally insulated from the surroundings of the housing by means of the thermal insulation region.

It may be favorable if the connection channel and/or the connection space is delimited by an outer wall of the housing, in particular a thermal insulation region of the outer wall of the housing, and/or by a partition wall delimiting the temperature treatment chamber.

The connection channel and/or the connection space is in particular delimited at the bottom with respect to the direction of gravity by the partition wall. At the top with respect to the direction of gravity, the connection channel and/or the connection space is preferably delimited by the outer wall, in particular a ceiling wall of the housing.

The connection channel and/or connection space preferably extends above the temperature treatment chamber, in particular directly above the temperature treatment chamber.

Preferably, the connection channel and/or connection space fills a spatial region within the housing located above the temperature treatment chamber in a vertical projection.

Furthermore, it can be provided that the connection channel and/or connection space is formed by a spatial region within the housing located above the temperature treatment chamber in a vertical projection.

It can be advantageous if the connection channel and/or connection space has a length along the conveying direction which corresponds at least approximately to twice, preferably at least approximately five times, in particular at least approximately ten times, a height of the connection channel and/or the connection space.

The height is in particular an extent in the vertical direction.

The dimensions mentioned in this description and the accompanying claims relate in particular to mean values of the stated parameters.

It may be favorable if the connection channel and/or connection space has a width, taken in the horizontal direction and perpendicular to the conveying direction, which corresponds at least approximately to twice, preferably at least approximately four times, in particular at least approximately eight times, a height of the connection channel and/or the connection space.

The above-described dimensioning of the connection channel and/or connection space in particular makes it possible to achieve efficient air guidance within the housing, with minimized pressure loss.

It may be favorable if a partition wall separates the temperature treatment chamber from at least one of the pressure chambers and/or from the connection channel and/or connection space.

It can be favorable if the partition wall is formed in multiple parts.

It can be advantageous if the partition wall comprises a ceiling partition wall separating the temperature treatment chamber from the connection channel and/or the connection space.

As an alternative or in addition thereto, it can be provided that the partition wall comprises one or more side partition walls, each separating a pressure chamber from the temperature treatment chamber and/or each having one or more inlet openings for supplying air from the respective pressure chamber to the temperature treatment chamber. One or more inlet openings are provided in particular with one or more nozzles or nozzle receptacles.

It may be favorable if the partition wall comprises one or more filter partition walls which each form a filter stage within the temperature treatment chamber and/or between a pressure chamber and the temperature treatment chamber. The one or more filter partition walls in particular form fine filter stages.

It may be favorable if the partition wall comprises one or more distributor spaces which are each arranged and/or formed in particular between a filter partition wall of the partition wall and a side partition wall of the partition wall.

The one or more filter partition walls in particular each comprise one or more receptacles for one or more filter elements, for example filter mats.

The one or more distributor spaces serve in particular for the uniform supply of the air flowing through the one or more filter elements, from the pressure chambers to the one or more inlet openings.

It may be favorable if one or more of the one or more air circulation systems each comprise a heating device by means of which at least some of the air guided in the temperature treatment chamber can be heated.

It may be favorable if the heating device is or comprises a fuel-operated heating device and/or an electric heating device.

The heating device can comprise, for example, a burner heater and/or an electric heater, one or more of the one or more air circulation systems preferably being provided with a separate burner and/or a separate electric heater for directly or indirectly heating the air.

The heating device can in particular comprise a heat exchanger by means of which heat can be transferred from a heat transfer medium to at least some of the air guided into the temperature treatment chamber.

In this case, the heat transfer can take place directly or indirectly.

For example, a clean gas heater with a decentralized heat exchanger can be provided. In this case, one or more air circulation systems can each be assigned a clean gas heat exchanger, by means of which heat is transferred from a clean gas (heating gas) to the air to be supplied to the temperature treatment chamber.

Alternatively or in addition thereto, a clean gas heater can be provided by means of a central heat exchanger. In this case, one or more of the air circulation systems can be provided with a heating gas flap (heating air flap), by means of which heating gas from a central heat exchanger can be admixed to the air circulated by means of the respective air circulation system, in a controlled and/or regulated manner.

Furthermore, a burner heater can alternatively or additionally be provided, one or more of the air circulation systems being provided with a separate burner in each case for the direct or indirect heating of the air. In this case, the air used for the respective burner can be fresh air, in particular hall air. Furthermore, air from the temperature treatment chamber can be used for operating the burner, in particular exhaust air from the exhaust air system, burner smoke gas produced in this case preferably being supplied to a regenerative thermal oxidation system for example, for further exhaust gas post-treatment.

Furthermore, it can be provided that a burner serves for complete cleaning of the exhaust air. This can be provided in particular in the case of a modular thermal exhaust gas cleaning device, in particular when the burner is used both for providing heating energy and for waste air cleaning.

It can be advantageous if the feed air system, the exhaust air system and/or the one or more air circulation systems each comprise one or more guide elements, in particular baffles, for influencing a flow.

Influencing the flow can be advantageous in particular when the feed air system, the exhaust air system and/or one or more air circulation systems are arranged laterally next to the temperature treatment chamber and/or so as to adjoin the temperature treatment chamber or a housing surrounding the temperature treatment chamber, in the horizontal direction. By means of one or more guide elements, in particular baffles, a uniform distribution of the flow along and/or transversely to the conveying direction and/or on both sides of the temperature treatment chamber can then be achieved in particular.

In particular when the feed air system, the exhaust air system and/or one or more air circulation systems are arranged laterally next to the temperature treatment chamber and/or so as to adjoin the temperature treatment chamber or a housing surrounding the temperature treatment chamber, in the horizontal direction, it can also be advantageous if air discharged from the temperature treatment chamber is sucked in and/or supplied via one or more guide elements, in particular baffles, which extend at least largely in the horizontal direction and/or deflect in the vertical direction, distribution of the air to one or more filter elements and/or to one or more heat exchangers taking place in particular subsequently, for example by means of one or more guide elements, in particular baffles, which extend at least largely in the vertical direction and/or deflect in the horizontal direction.

Preferably, in each case at least one distributor structure is arranged upstream, in particular directly upstream, of one or more filter elements and/or upstream, in particular directly upstream, of one or more heat exchangers, each of which distributor structures in particular comprises one or more guide elements or is formed therefrom.

As an alternative or in addition thereto, it can be provided for at least one collecting structure, which in particular comprises one or more guide elements or is formed therefrom, to be arranged in each case upstream, in particular directly upstream, of one or more filter elements and/or upstream, in particular directly upstream, of one or more heat exchangers.

Preferably, one or more guide elements are formed so as to be uniformly and/or continuously curved, completely or in portions, as a result of which a gentle flow diversion or flow deflection can preferably be obtained, in particular while avoiding or minimizing turbulence.

A guide element is in particular a different element from a channel or another spatially delimiting flow guide.

In particular, a guide element serves to influence the flow within a flow channel and/or flow space.

It may be favorable if the connection channel and/or the connection space comprise one or more guide elements for influencing a flow within the connection channel and/or connection space.

The one or more guide elements preferably extend at least approximately over an entire height of the connection channel and/or the connection space.

In particular, the one or more guide elements extend over at least approximately 10%, preferably at least approximately 30%, for example at least approximately 50%, of an entire length of a respective connection channel and/or connection space, along the conveying direction.

The one or more guide elements preferably serve for diverting and/or distributing the air flowing into the connection channel and/or connection space transversely to the inflow direction. In particular, it can be provided that the air flows into the connection channel and/or connection space substantially perpendicularly to the conveying direction and is then diverted by means of one or more guide elements, in particular in a direction which has an angle of less than 45°, preferably less than 20°, with the conveying direction. As a result, the entire length of the connection channel and/or connection space along the conveying direction for distributing the inflowing air to one or both pressure chambers can preferably be utilized.

One or more guide elements are preferably guide elements that deflect in the vertical direction, in particular baffles.

Alternatively or additionally thereto, it can be provided that one or more guide elements are guide elements deflecting in the horizontal direction, in particular baffles.

It can be provided that one or more guide elements each have one or more passage openings. As a result, an air distribution can preferably be optimized by means of the one or more guide elements.

In particular, it can be provided that one or more guide elements are formed as perforated plates or each comprise at least one perforated plate.

It can be advantageous if one or more guide elements are arranged with respect to a transverse direction extending horizontally and perpendicularly to the conveying direction, between two directing regions of the conveying device extending along the conveying direction, in particular in a spatial region located above the temperature treatment chamber or below the temperature treatment chamber.

A guide region of the conveying device is formed in particular by a rail extending along the conveying direction and/or by a plurality of roller elements or directing elements which are in succession along the conveying direction.

It may be favorable if the one or more air circulation systems each comprise one or more fans and/or one or more heating devices and/or one or more cooling devices and/or channels and/or passages that are independent of one another and are intended for connection to the temperature treatment chamber.

For example, it can be provided that each air circulation system is assigned exactly one fan, by means of which air can be sucked out of the temperature treatment chamber and can be fed from one side of the housing surrounding the temperature treatment chamber, into the interior of the housing. Via the connection channel and/or connection space, the air preferably supplied in the ceiling region is preferably distributed to both pressure chambers arranged on both sides of the temperature treatment chamber and fed via the pressure chambers to the temperature treatment chamber.

It may be favorable if the air from the temperature treatment chamber is discharged substantially centrally in a respective temperature treatment system portion, with respect to the conveying direction. As a result, an air exchange or another impairment between adjacent temperature treatment system portions can preferably be minimized.

In the case of a cycle conveying device, it is preferably provided that the discharge of the air from the respective temperature treatment system portion takes place between two cycle positions (cycles; holding positions) at which the workpieces are stopped for a cycle. As a result, an undesired influence of the air discharge on the temperature treatment of the workpieces can preferably be minimized.

It can be favorable if the suction and/or discharge of the air from the temperature treatment chamber takes place between two cycle positions. In this way, an optimized convection flow between the cycle positions can preferably be generated. Furthermore, the suction and/or discharge can thereby preferably take place completely outside the individual spatial regions in which the workpieces are stopped for a cycle. This in turn allows preferably a flexible and/or restriction-free arrangement of nozzles over the entire individual spatial regions in which the workpieces are stopped for a cycle.

By means of the suction and/or discharge between the cycle positions and/or an arrangement of outlets and/or channels required for the suction and/or discharge between the cycle positions, space can preferably be created for an arrangement of nozzles, for supplying air to the temperature treatment chamber, distributed along the conveying direction over an entire cycle position (cycle; holding position; body length/holding space length). This preferably allows uniform temperature treatment of the workpieces.

Particularly by integrating a connection channel and/or connection space into an interior of the housing, a particularly compact configuration of the temperature treatment system can be realized. For example, this can be used to accommodate, in a compact manner, a temperature treatment system comprising two temperature treatment chambers that extend parallel to one another at least in portions.

In this case, it can be provided in particular that the temperature treatment system comprises two temperature treatment chambers which run parallel to one another at least in portions and which are assigned to mutually different and/or independent air circulation systems.

In this case, it can be provided that two housings surrounding the temperature treatment chambers adjoin one another directly and/or are formed at least in portions by the same walls, in particular a common outer wall, which then forms an intermediate wall.

Alternatively or additionally, it can be provided that the one or more air circulation systems of each temperature treatment chamber are arranged on an outer side of the housing surrounding said temperature treatment chamber, said outer side being arranged facing away from the other housing. The two temperature treatment chambers are thus arranged between the air circulation systems with respect to a direction running horizontally and perpendicularly to the conveying direction.

In particular, one or more conveying devices can be provided for conveying the workpieces through a temperature treatment chamber.

For example, a carrying chain conveyor and/or a roller track can be provided as the conveying device. Furthermore, rail conveyors and/or floor-bound transport systems, in particular freely driving driverless transport systems, can be provided. In addition to cycle conveying, continuous conveying can also be provided.

Further preferred features and/or advantages of the invention form the subject matter of the following description and the drawings illustrating embodiments.

The same or functionally equivalent elements are provided with the same reference signs in all figures.

DETAILED DESCRIPTION OF THE DRAWINGS

Figure 18:
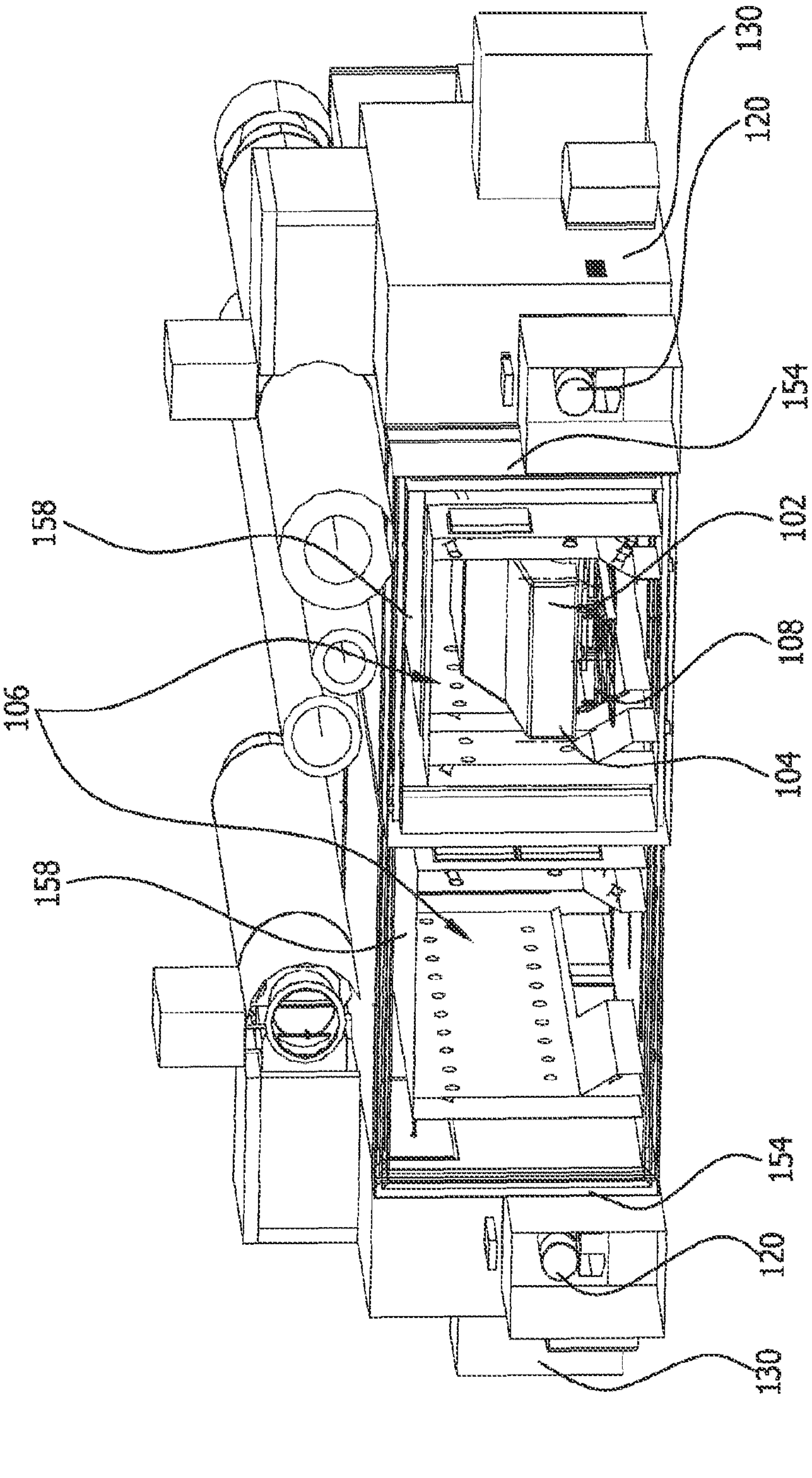
FIG. 18 is a schematic perspective vertical cross section through a fourth embodiment of a temperature treatment system.

A first embodiment, shown in FIG. 1 to 7, of a temperature treatment system designated as a whole by 100 serves in particular for the temperature treatment of workpieces 102, for example vehicle bodies 104 (in this respect, see the fourth embodiment shown in FIG. 18).

A temperature treatment system 100 comprises in particular a temperature treatment chamber 106 through which the workpieces 102 can be conveyed, by means of a conveying device 108, along a conveying direction 110.

The temperature treatment chamber 106 is in particular surrounded by a housing 112 which is, for example, substantially cuboid.

The air located in the temperature treatment chamber 106 is preferably itself temperature-controlled, in particular conditioned, for the temperature treatment of the workpieces 102. For example, cooling and/or heating of the air is provided.

For this purpose, the temperature treatment system 100 comprises a feed air system 114, by means of which feed air, in particular temperature-controlled fresh air, can be fed to the temperature treatment chamber 106. The feed air system 114 comprises in particular a feed air channel 116, which is designed, for example, as a ventilation tower 118 and serves to suck in air over a hall roof.

The feed air system 114 further comprises a fan 120 for driving the air and a distributor channel 122, by means of which the air can be distributed to one or two pressure chambers 124 within the housing 122 in order ultimately to be supplied via the pressure chambers 124 to the temperature treatment chamber 106 (see FIG. 3 to 6).

Figure 7:
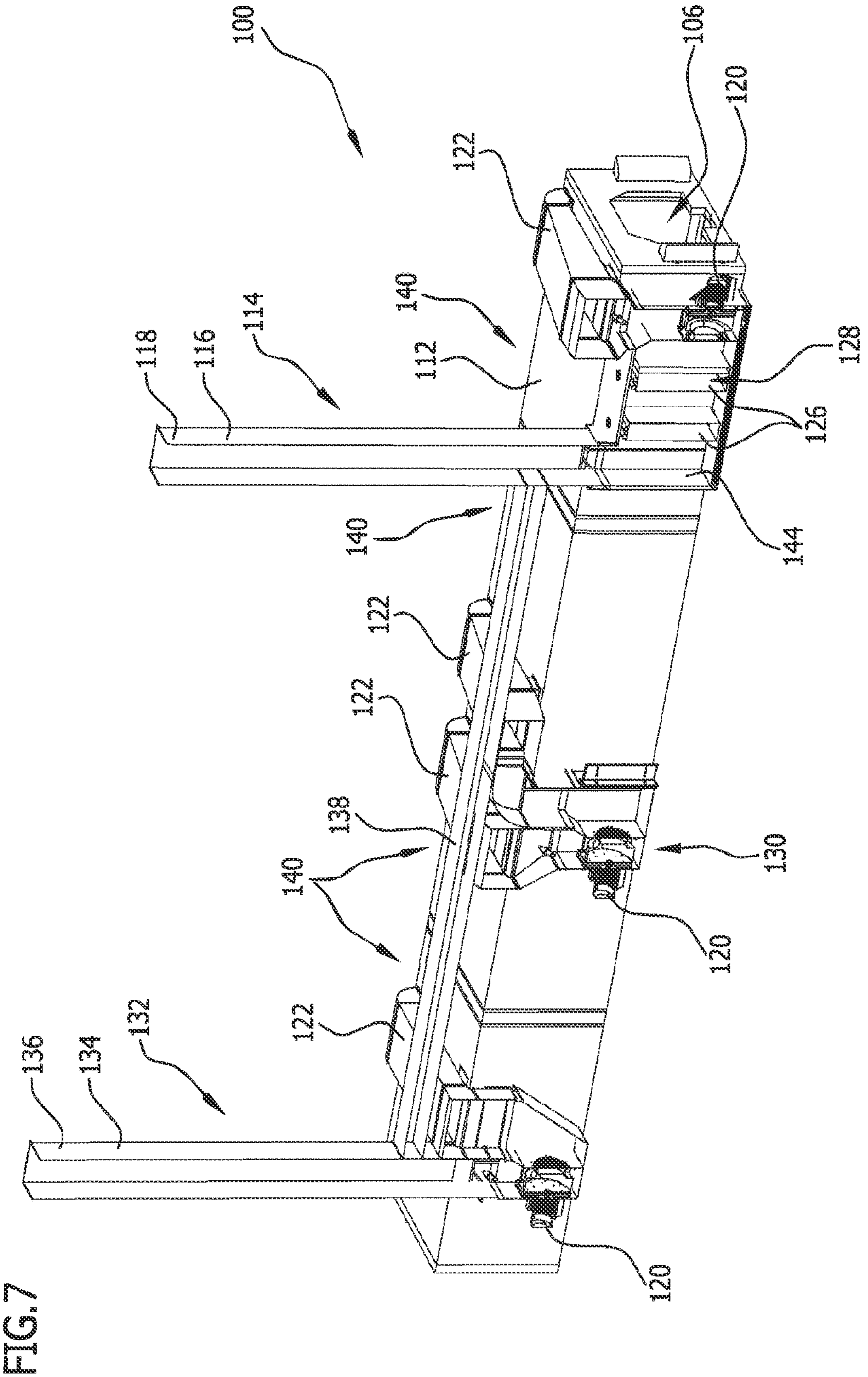
FIG. 7 is a schematic vertical longitudinal section through a feed air system, an air circulation system and an exhaust air system of the temperature treatment system from FIG. 1.
Figure 8:
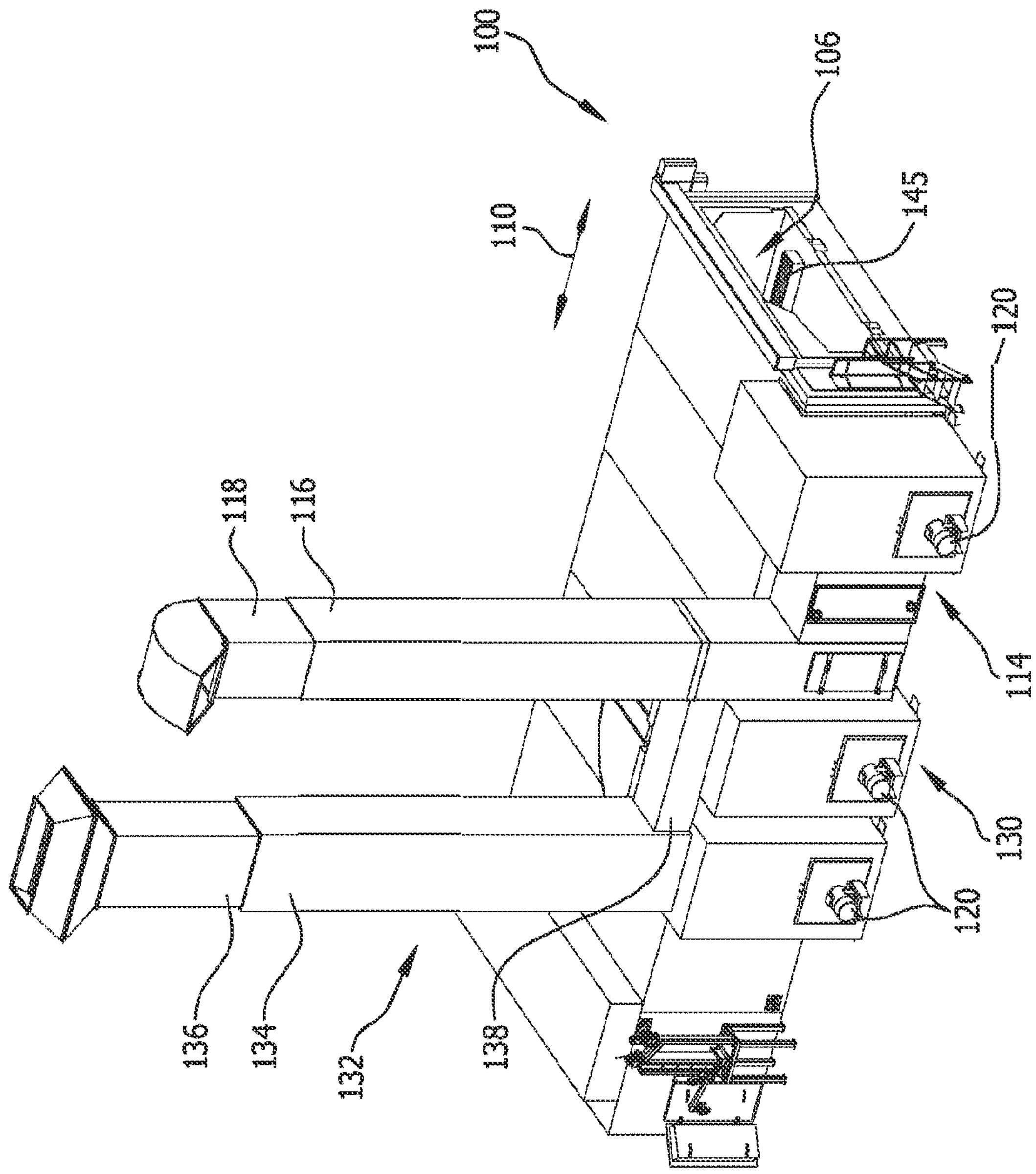
FIG. 8 is a schematic perspective view of a second embodiment of a temperature treatment system.
Figure 9:
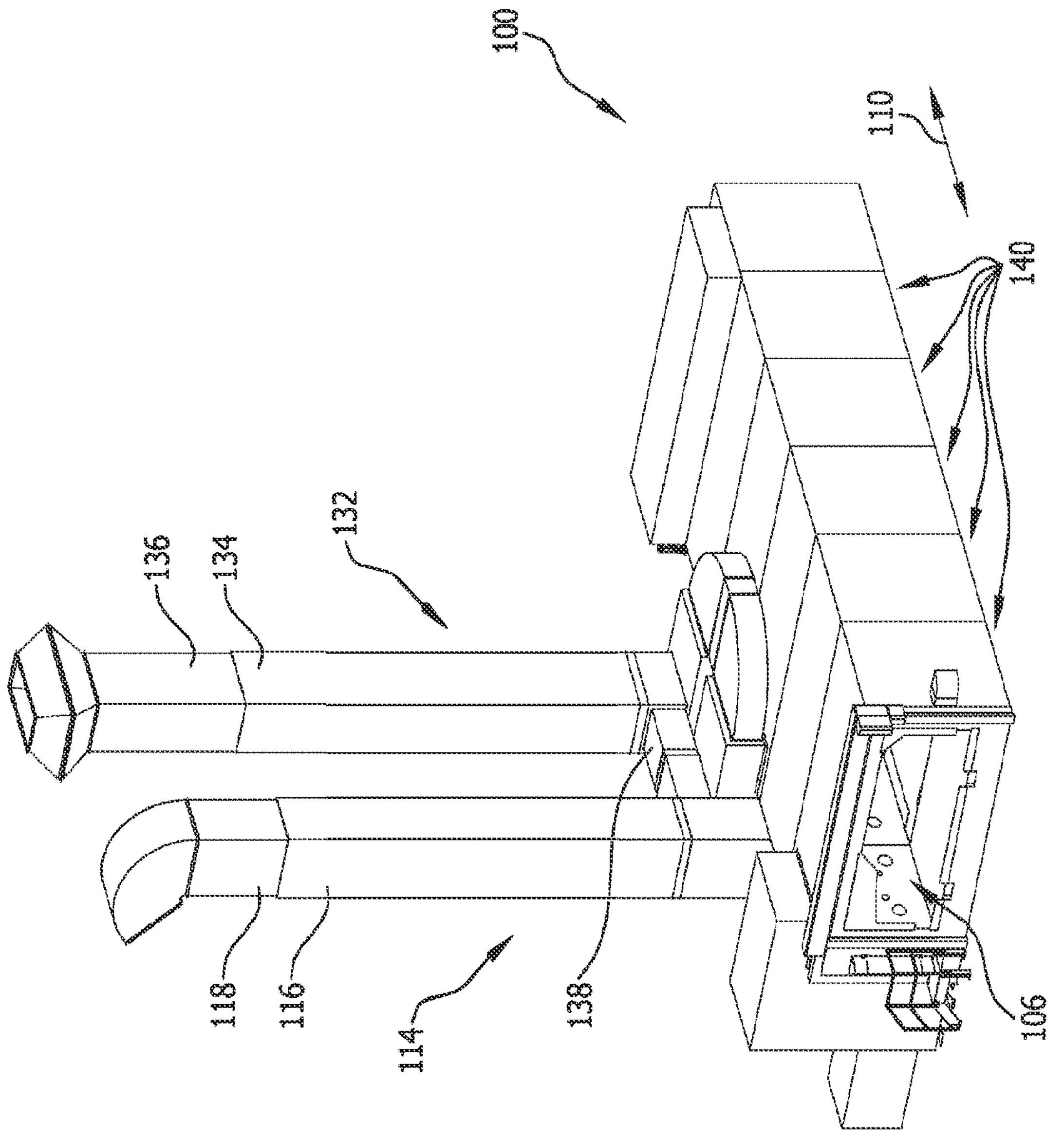
FIG. 9 is a further schematic perspective view of the temperature treatment system from FIG. 8.
Figure 10:
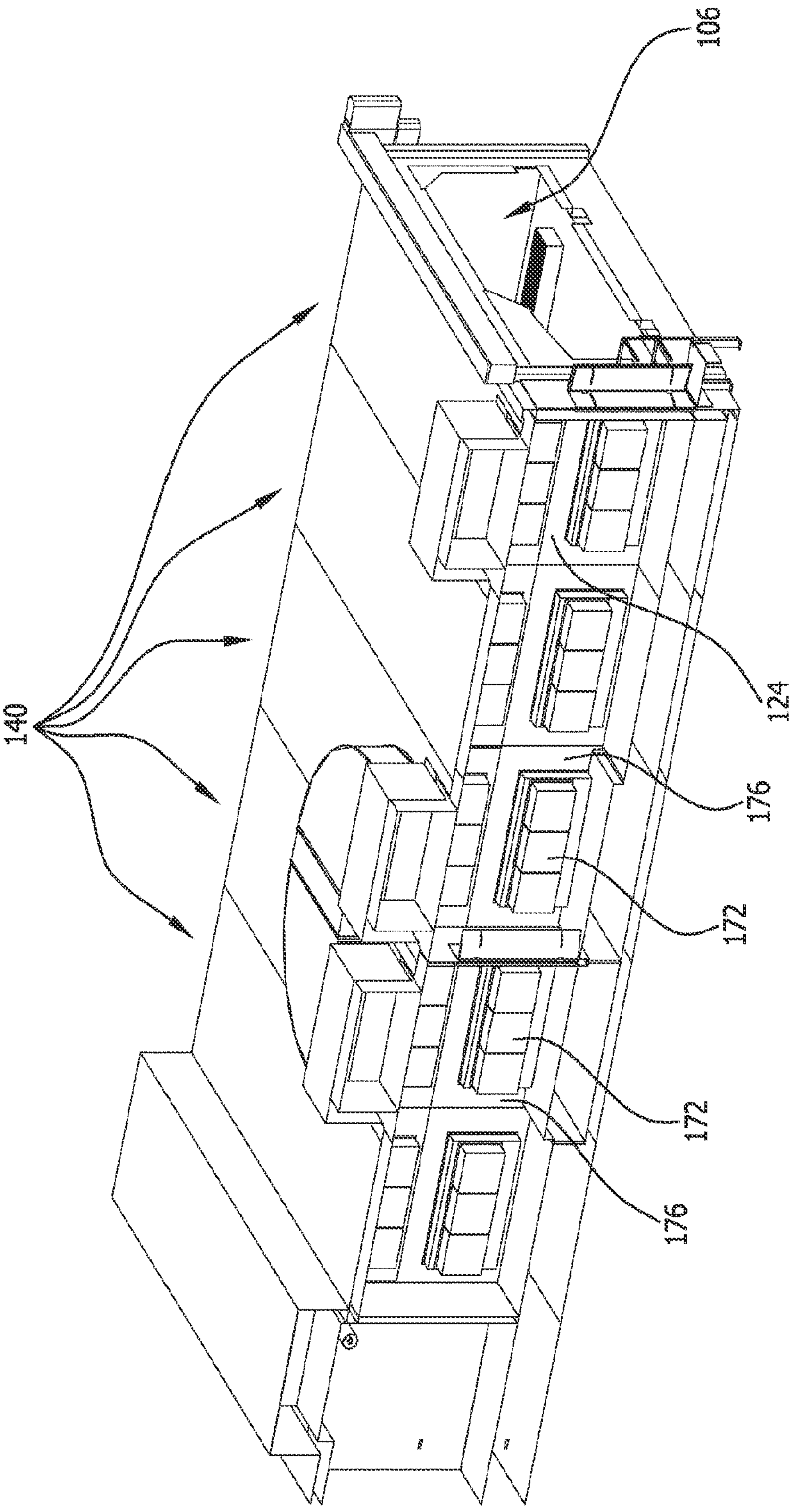
FIG. 10 is a schematic vertical longitudinal section through lateral pressure chambers of the temperature treatment system from FIG. 8.
Figure 11:
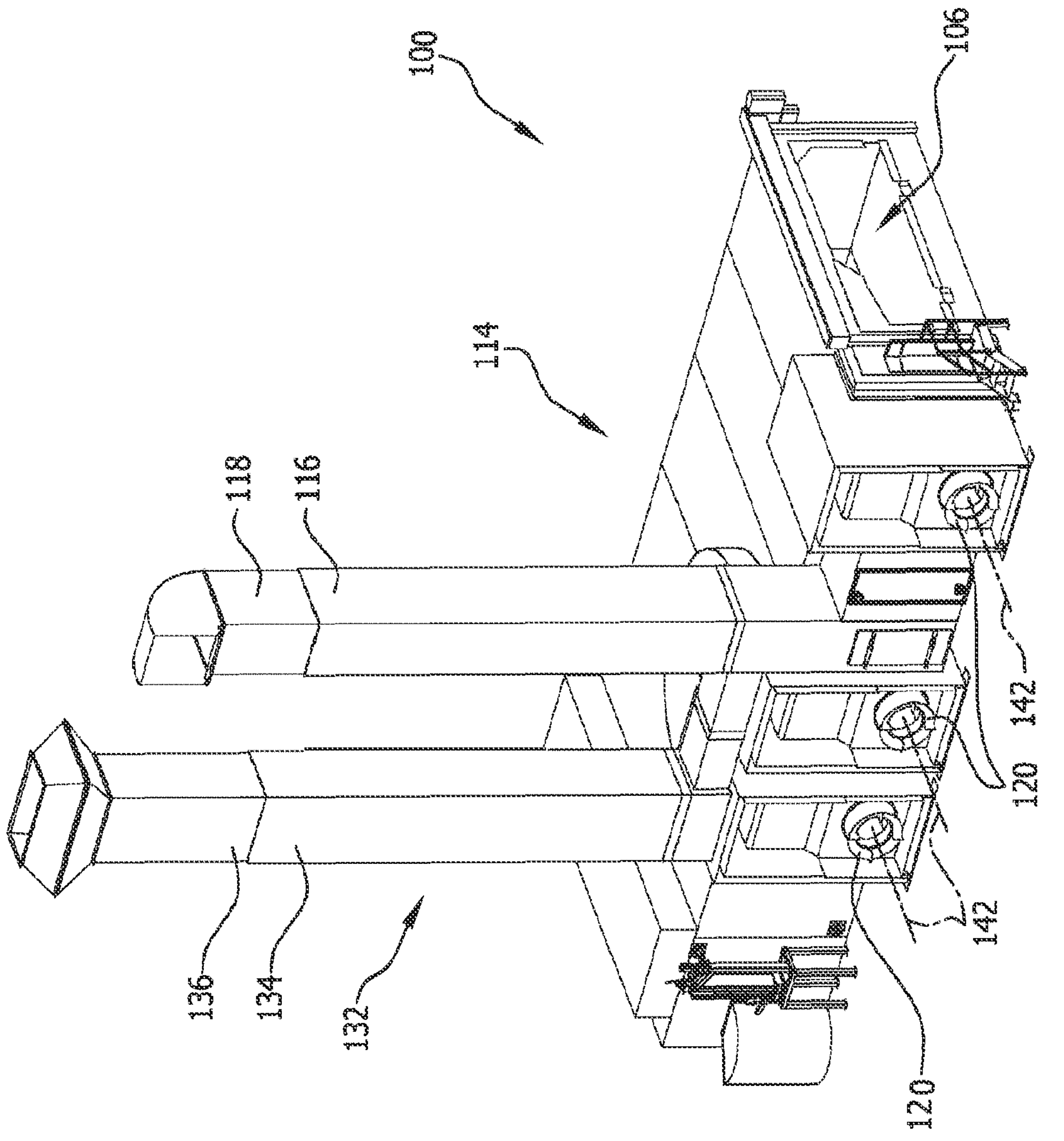
FIG. 11 is a schematic vertical longitudinal section through a feed air system, an air circulation system and an exhaust air system of the temperature treatment system from FIG. 8.

As can be seen in particular from FIG. 7, the feed air system 114 can further be provided with one or more filter stages 126 and/or one or more heat exchangers 128, in particular for cleaning and/or conditioning the air.

Humidifying and/or dehumidifying of the air can also optionally be provided by means of corresponding conditioning devices.

The temperature treatment system 100 further comprises an air circulation system 130, which in particular comprises at least one fan 120 and serves to discharge air from the temperature treatment chamber 106 and to feed it again to the temperature treatment chamber 106.

Furthermore, the temperature treatment system 100 comprises an exhaust air system 132, which in particular comprises an exhaust air channel 134.

The exhaust air channel 134 is designed, for example, as a ventilation tower 136 and serves to discharge exhaust air from the temperature treatment chamber 106 and to output the exhaust air to the surroundings, for example over a hall roof.

The exhaust air system 132 further comprises a fan 120, by means of which air can be extracted from the temperature treatment chamber 106 and output to the surroundings.

Optionally, a return channel 138 can also be provided, by means of which a connection between the exhaust air channel 134 of the exhaust air system 132 and the feed air channel 116 of the feed air system 114 can be established.

In particular, exhaust air can be added to the feed air via the return channel 138. For this purpose, in particular a flap and/or a valve device can be provided, together with suitable control and/or regulation, in order to control and/or regulate the admixture of a predetermined exhaust air flow to the feed air.

Figure 1:
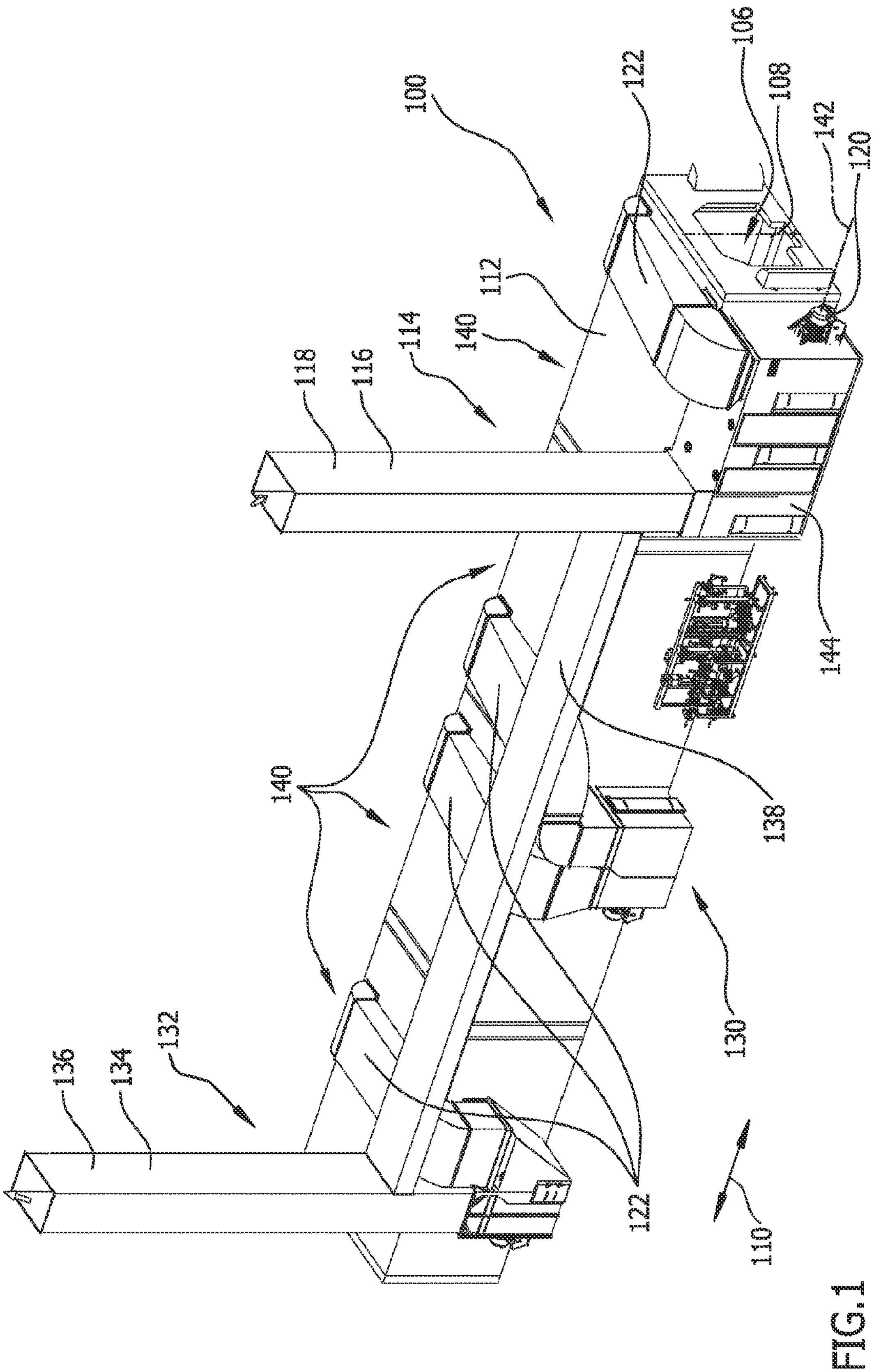
FIG. 1 is a schematic perspective view of a first embodiment of a temperature treatment system.
Figure 2:
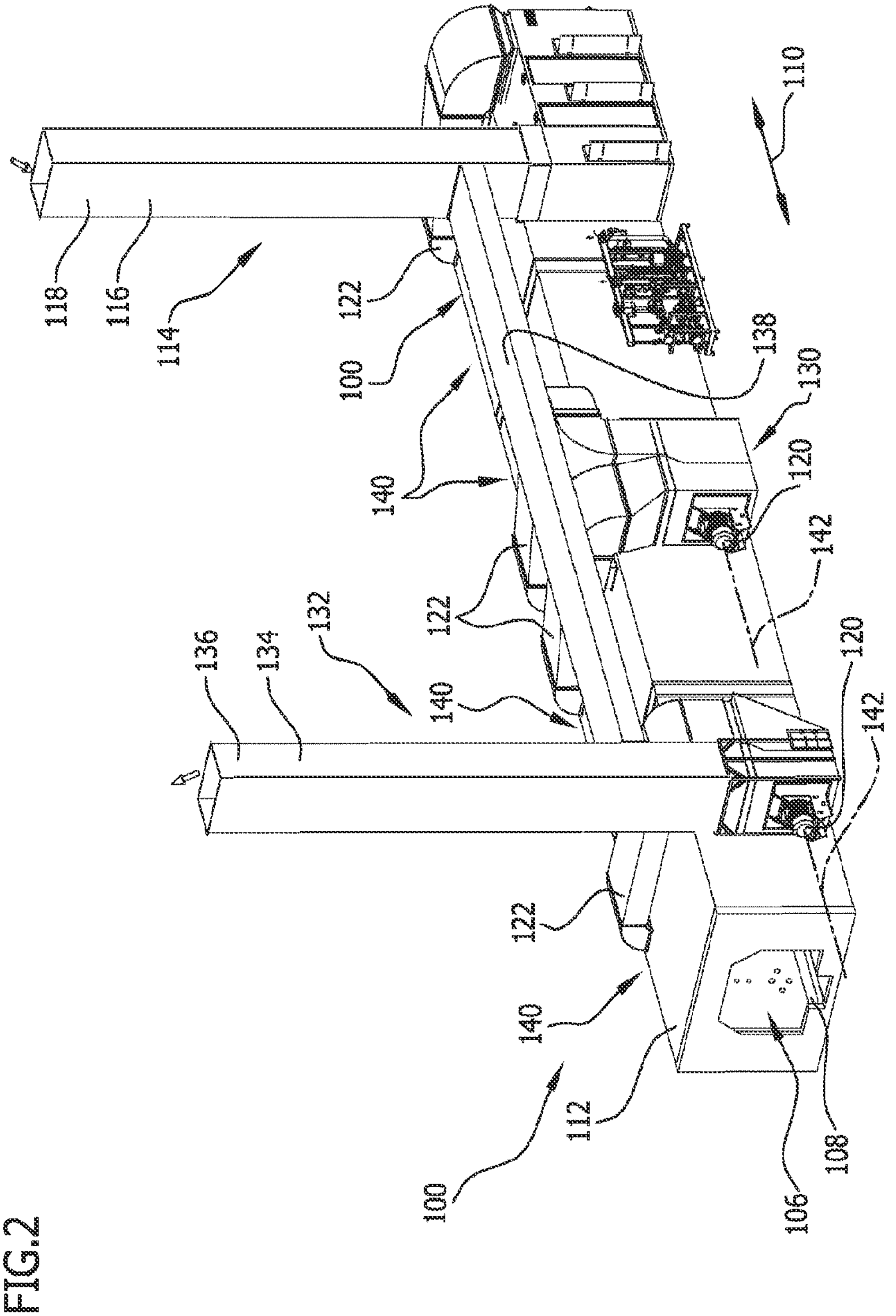
FIG. 2 is a further schematic perspective view of the temperature treatment system from FIG. 1.
Figure 3:
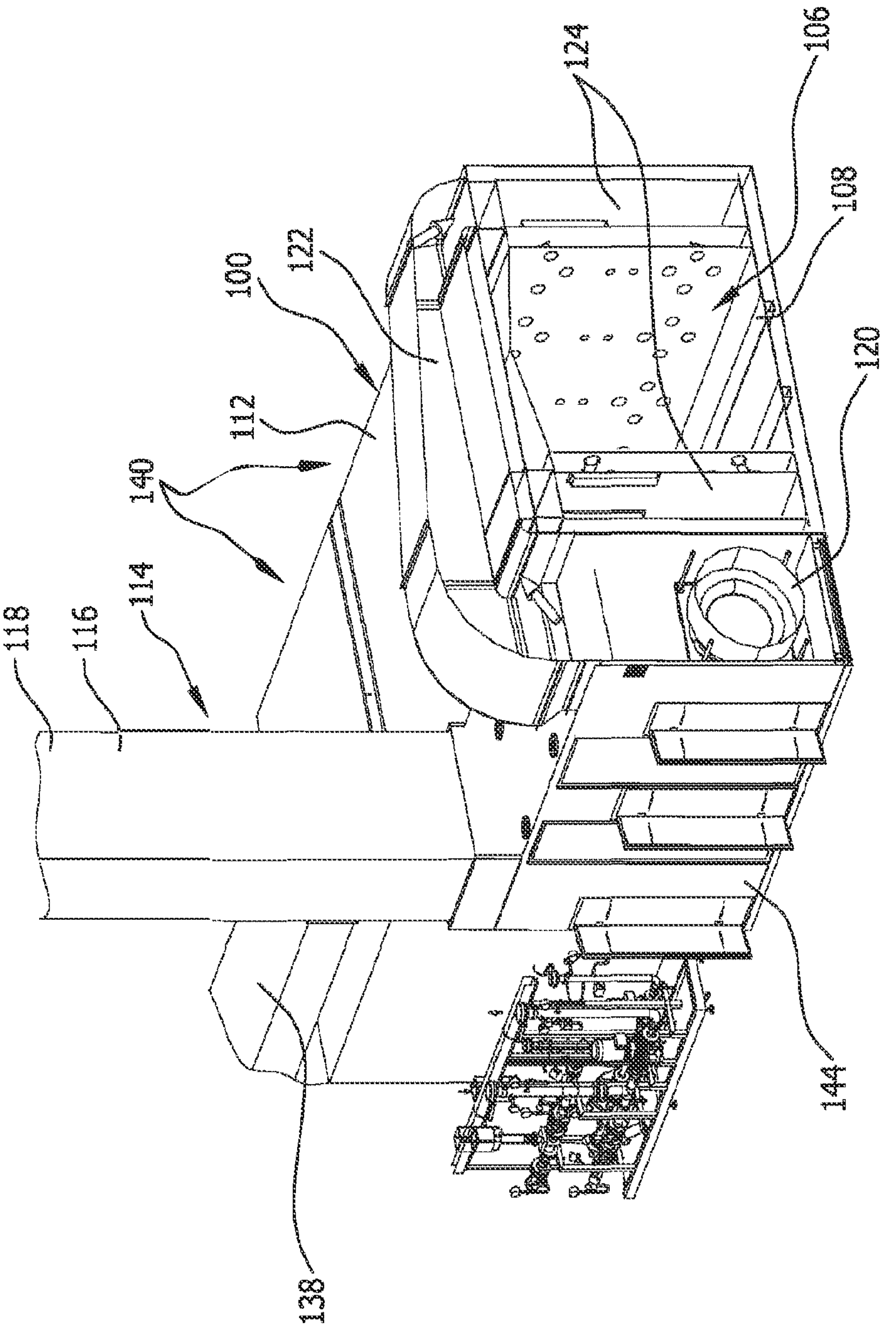
FIG. 3 is a schematic vertical cross section through a feed air system of the temperature treatment system from FIG. 1.
Figure 4:
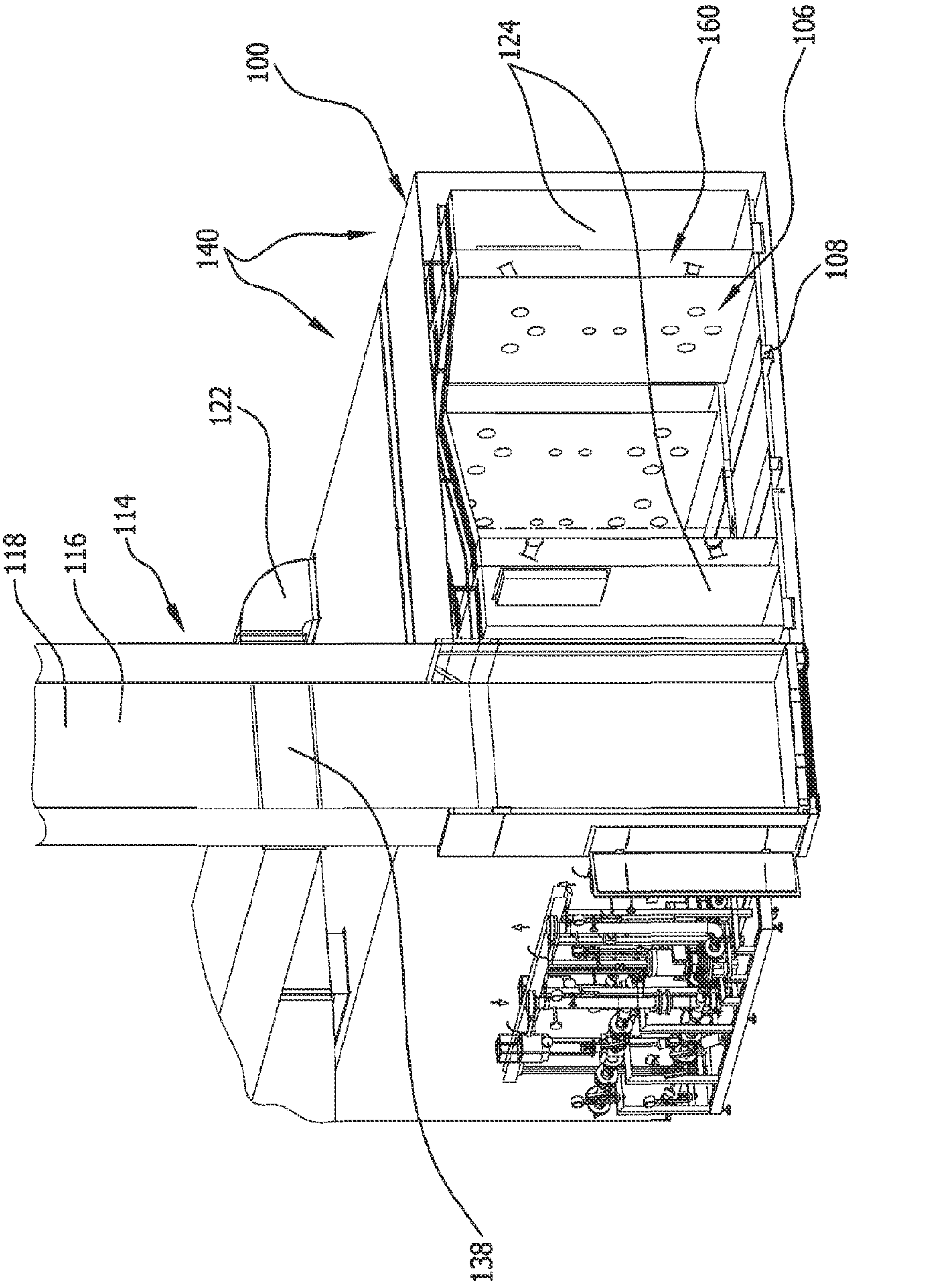
FIG. 4 is a further schematic vertical cross section through the feed air system of the temperature treatment system from FIG. 1.
Figure 5:
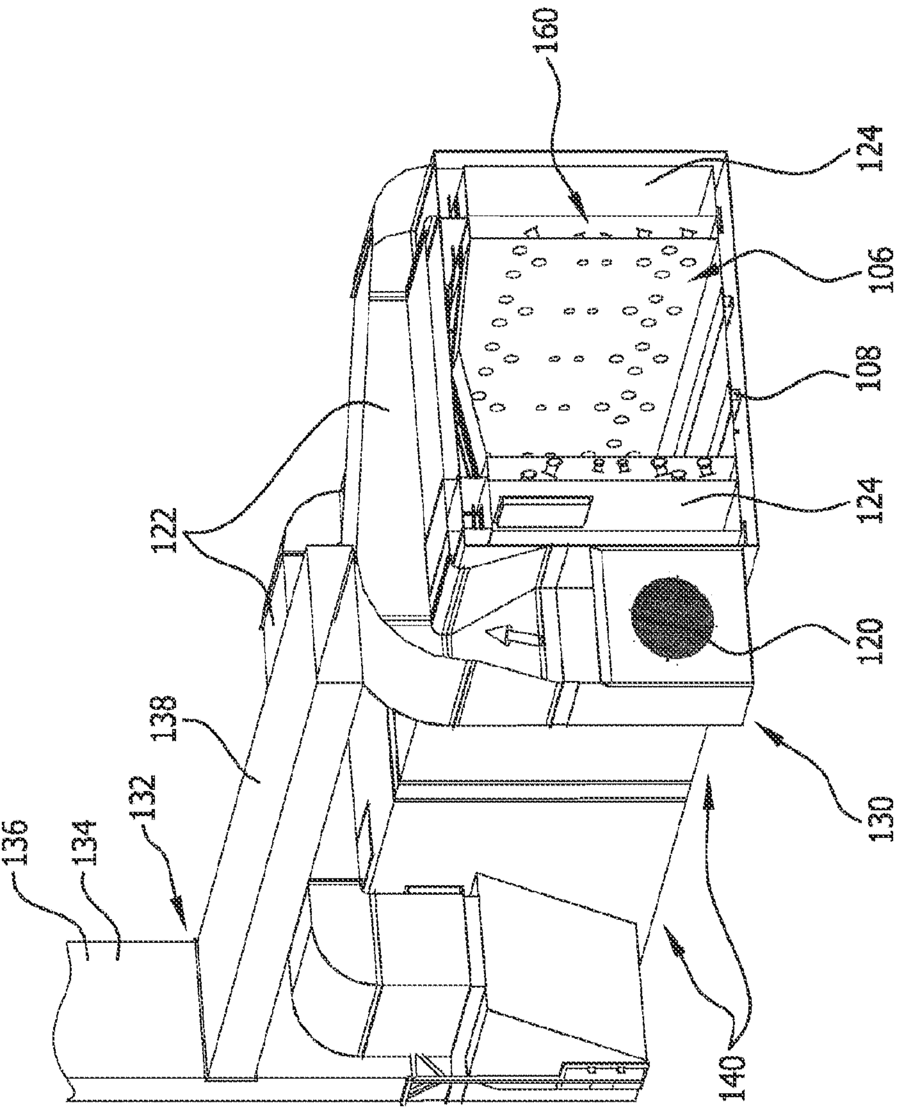
FIG. 5 is a schematic vertical cross section through an air circulation system of the temperature treatment system from FIG. 1.
Figure 6:
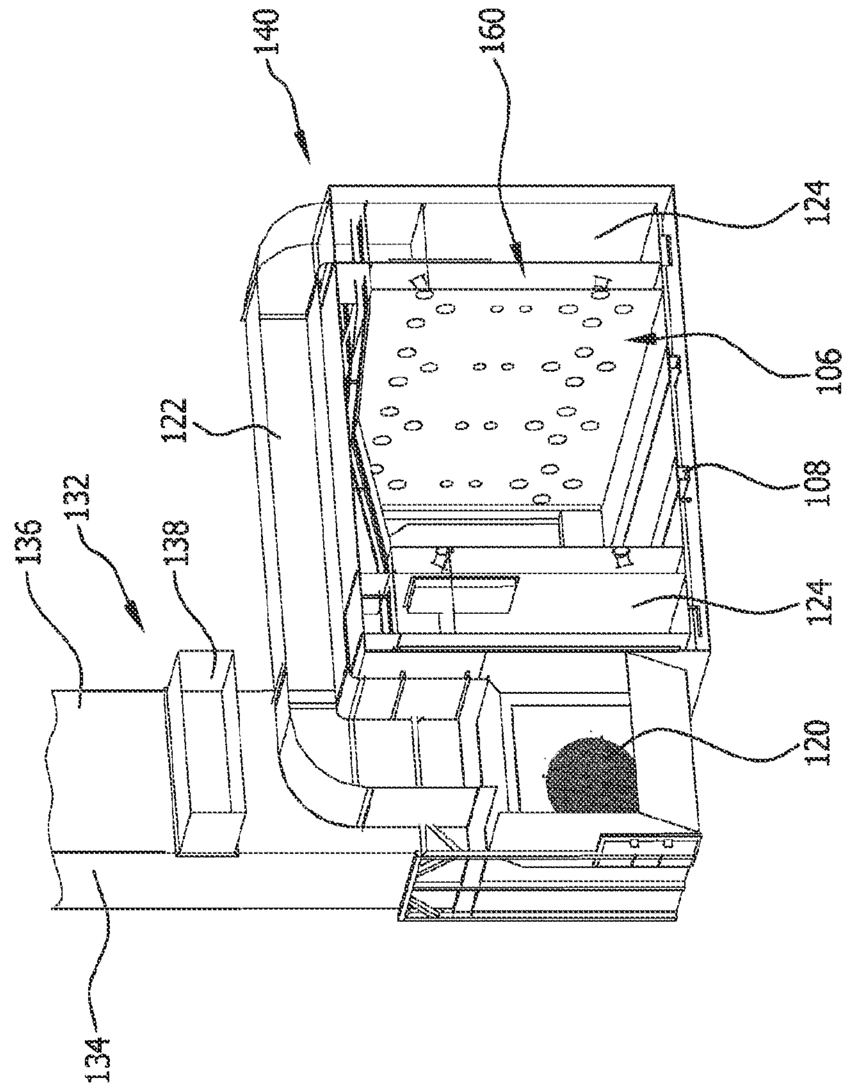
FIG. 6 is a schematic vertical cross section through an exhaust air system of the temperature treatment system from FIG. 1.

As can be seen in particular in FIG. 1, the temperature treatment system 100 can be divided into a plurality of temperature treatment system portions 140, each temperature treatment system portion 140 forming a temperature treatment system module, for example.

The temperature treatment system portions 140 are in particular arranged in succession along the conveying direction 110.

The feed air system 114 is preferably assigned to one temperature treatment system portion 140.

The exhaust air system 132 is preferably assigned to a further temperature treatment system portion 140.

In this case, the feed air system 114 and the exhaust air system 132 are preferably arranged on temperature treatment system portions 140 which are arranged at mutually opposing ends of the temperature treatment system 100.

The air circulation system 130 is in particular assigned to or arranged on one or more temperature treatment system portions 140 which are arranged between the feed air system 114 and the exhaust air system 132.

In the first embodiment of the temperature treatment system 100 shown in FIG. 1 to 7, the components of the feed air system 114, the air circulation system 130 and the exhaust air system 132 are relatively far apart from one another, so that an installation space along the conveying direction 110 can be optimally utilized.

The fans 120 of the feed air system 114, the air circulation system 130 and/or the exhaust air system 132 are preferably oriented in such a way that their axes of rotation 142 run substantially parallel to the conveying direction 110.

An installation space and/or maintenance space for the fans 120 thus extends substantially parallel to the conveying direction 110, away from the respective fan 120, whereby a space required laterally for the maintenance of the temperature treatment system 100 can be minimized.

As can also be seen in particular in FIGS. 1 and 7, the following components are preferably arranged in succession in the feed air system 114, starting from one end of the temperature treatment system 100, along the conveying direction 110: First, the fan 120 is provided, which is followed, along the conveying direction 110, by one or more heat exchangers 128 and/or one or more filter stages 126. Along the conveying direction 110 there then follows a supporting region 144 for supporting the feed air channel 116 designed for example as a ventilation tower 114.

Such an embodiment of the feed air system 114 allows the temperature treatment system 100 to be preferably particularly short, since no further components are required along the conveying direction 110 beyond the temperature treatment chamber 106. Rather, the air is sucked in, in an intermediate region spaced apart from the end of the temperature treatment chamber 106, it nonetheless being possible for the air to be supplied to the temperature treatment chamber 106 at the immediate end of the temperature treatment chamber 106.

A second embodiment of a temperature treatment system 100 illustrated in FIG. 8 to 15 differs from the first embodiment shown in FIG. 1 to 7 essentially in that the temperature treatment system 100 is of very compact design and has a smaller length, in particular in the conveying direction 110.

The resulting reduced installation space along the conveying direction 110 is compensated in this embodiment in particular by the rotation axes 142 of the fans 120 (see in particular FIG. 11) not being oriented parallel to the conveying direction 110, but perpendicular thereto.

The individual components of the feed air system 114, the air circulation system 130 and the exhaust air system 132 can thereby be arranged particularly closely next to one another and/or in succession.

Such a shortened configuration of the temperature treatment system 100 can be provided in particular in the case of transverse conveying of the workpieces 102.

In the case of such transverse conveying, a longitudinal axis of the workpieces 102 is oriented substantially horizontally and perpendicularly to the conveying direction 110, while the workpieces 102 are conveyed along the conveying direction 110, through the temperature treatment chamber 106. As can be seen in particular from FIGS. 12 and 13, in the air circulation system 130, just as in the exhaust air system 132, of the temperature treatment system 100 according to the second embodiment, one or more suction openings 145 are provided in a base region 146 of the temperature treatment system 100. The air is supplied via one-sided pressure chambers 124 (see in particular FIG. 10).

Figure 12:
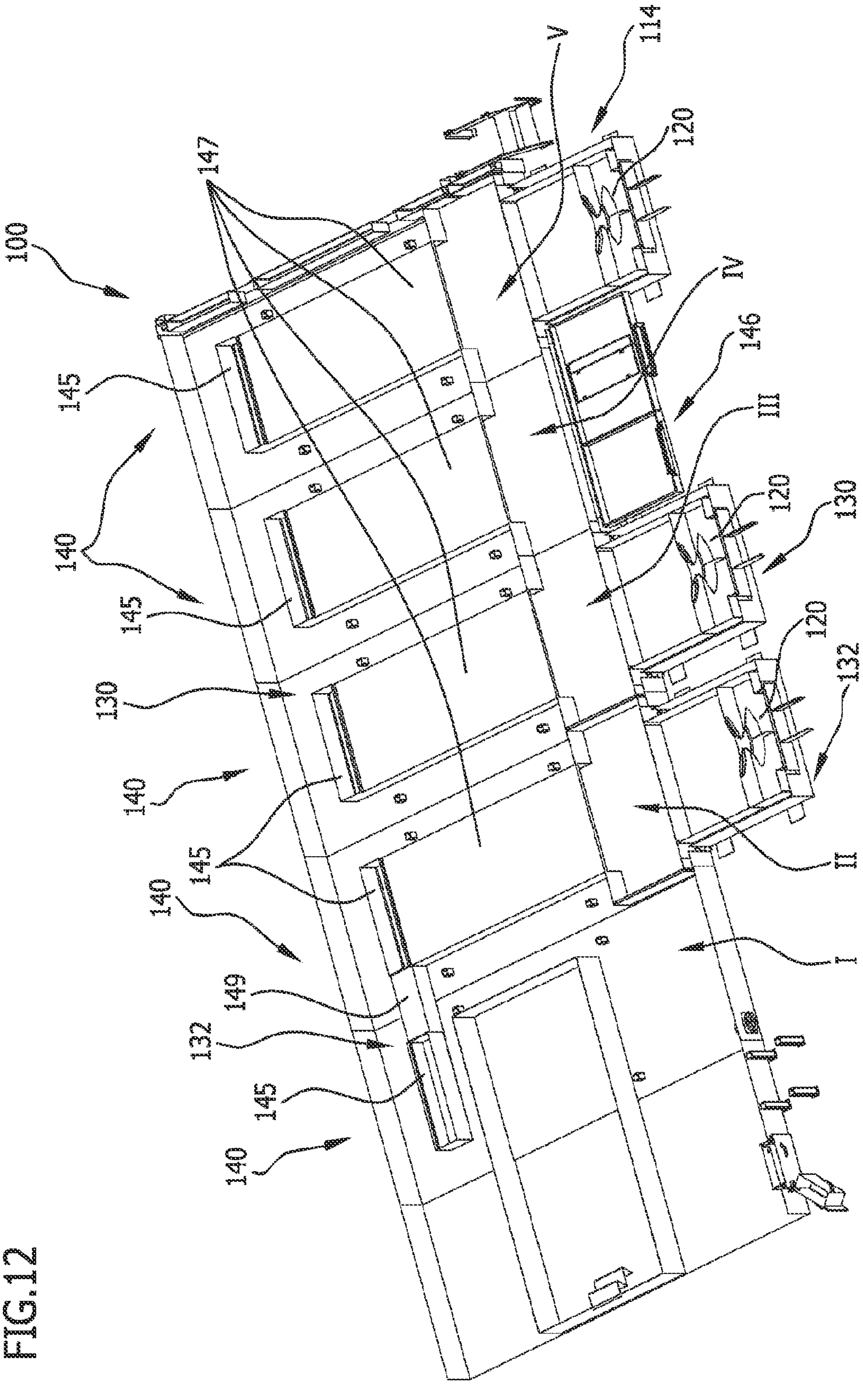
FIG. 12 is a schematic horizontal section through a base region of the temperature treatment system from FIG. 8.
Figure 13:
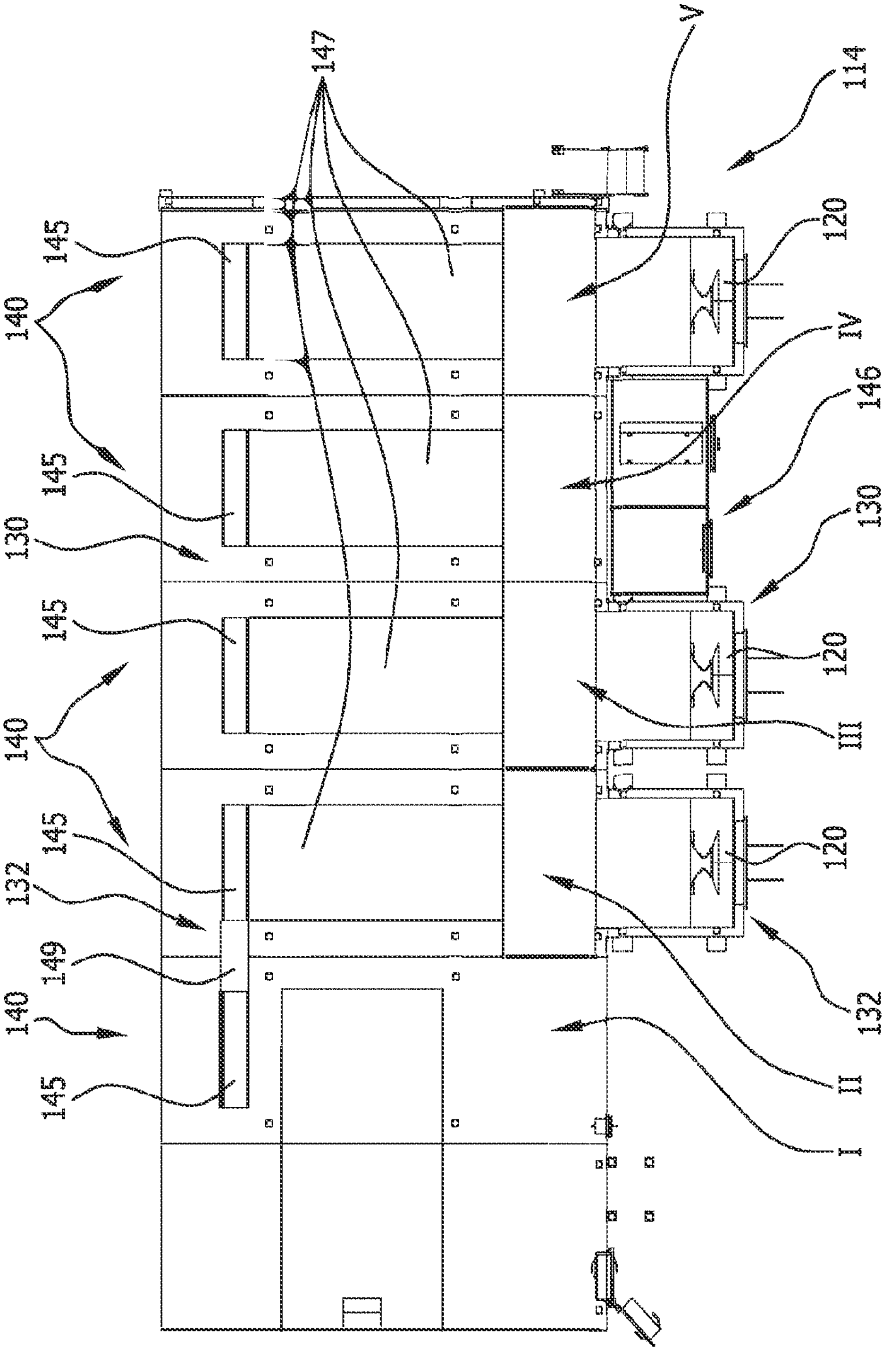
FIG. 13 is a schematic plan view from above of the horizontal section from FIG. 12.
Figure 14:
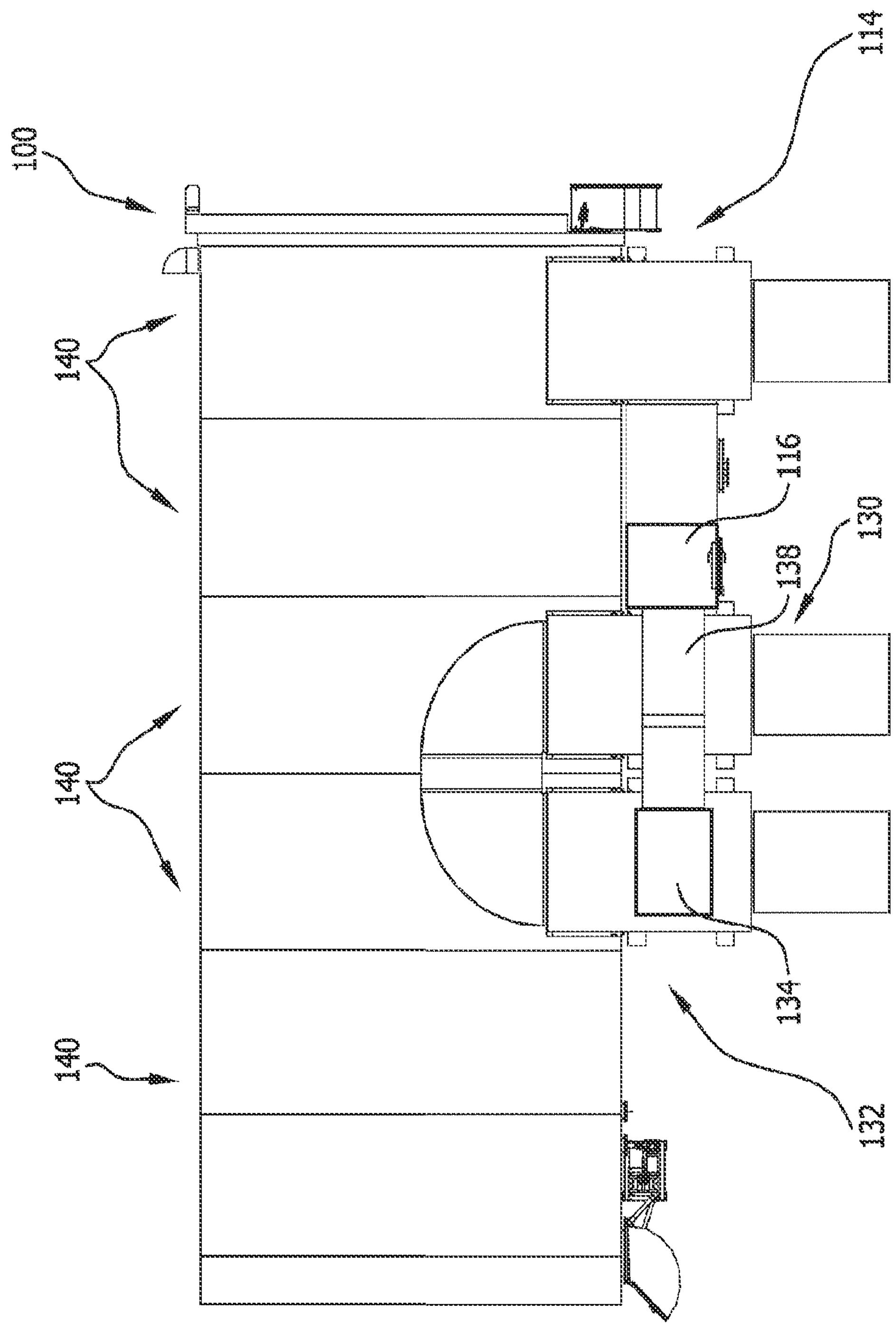
FIG. 14 is a schematic plan view of an upper side of the temperature treatment system from FIG. 8.

As can also be seen from FIG. 12, in the second embodiment of the temperature treatment system 100, five temperature treatment system portions 140 of the temperature treatment system 100 are provided, each temperature treatment system portion 140 corresponding to a holding position of the workpieces 102 in a cycle conveying mode of the conveying device 108.

The air is sucked out of the temperature treatment chamber 106 by means of the exhaust air system 132 at the first two holding positions (temperature treatment system portions 140), i.e. at the holding positions I and II (cycle 1 and cycle 2). In this case, an underfloor channel 147 is provided in the temperature treatment system portion 140 forming the holding position II. The underfloor channel 147 runs below the temperature treatment chamber 106 and connects the suction opening 145 of the holding position II to the fan 120 of the exhaust air system 132.

A suction opening 145 of the holding position I is connected by means of a connecting region 149 to the end of the underfloor channel 147 of the holding position II facing the suction opening 145 of the holding position II, so that both the air from the holding position I and the air from the holding position II can be drawn in via the underfloor channel 147 of the holding position II.

At the three further temperature treatment system portions 140, i.e. at the holding positions III, IV and V (cycle 3, cycle 4, cycle 5), suction is carried out by means of the air circulation system 130. In this case, each of the holding positions III, IV, V preferably has a separate underfloor channel 147 for connecting the suction opening 145 of each holding position III, IV, V to the fan 120 of the air circulation system 130.

The air supplied via the feed air system 114 in the last cycle (holding position V, cycle 5) thus flows through the temperature treatment chamber 106 counter to the conveying direction 110, since the latter initially circulates in the temperature treatment system portions 140 forming the holding positions III, IV, V, by means of the air circulation system 130, and is finally discharged by means of the exhaust air system 132 in the temperature treatment system portions 140 forming the holding positions I and II.

Figure 15:
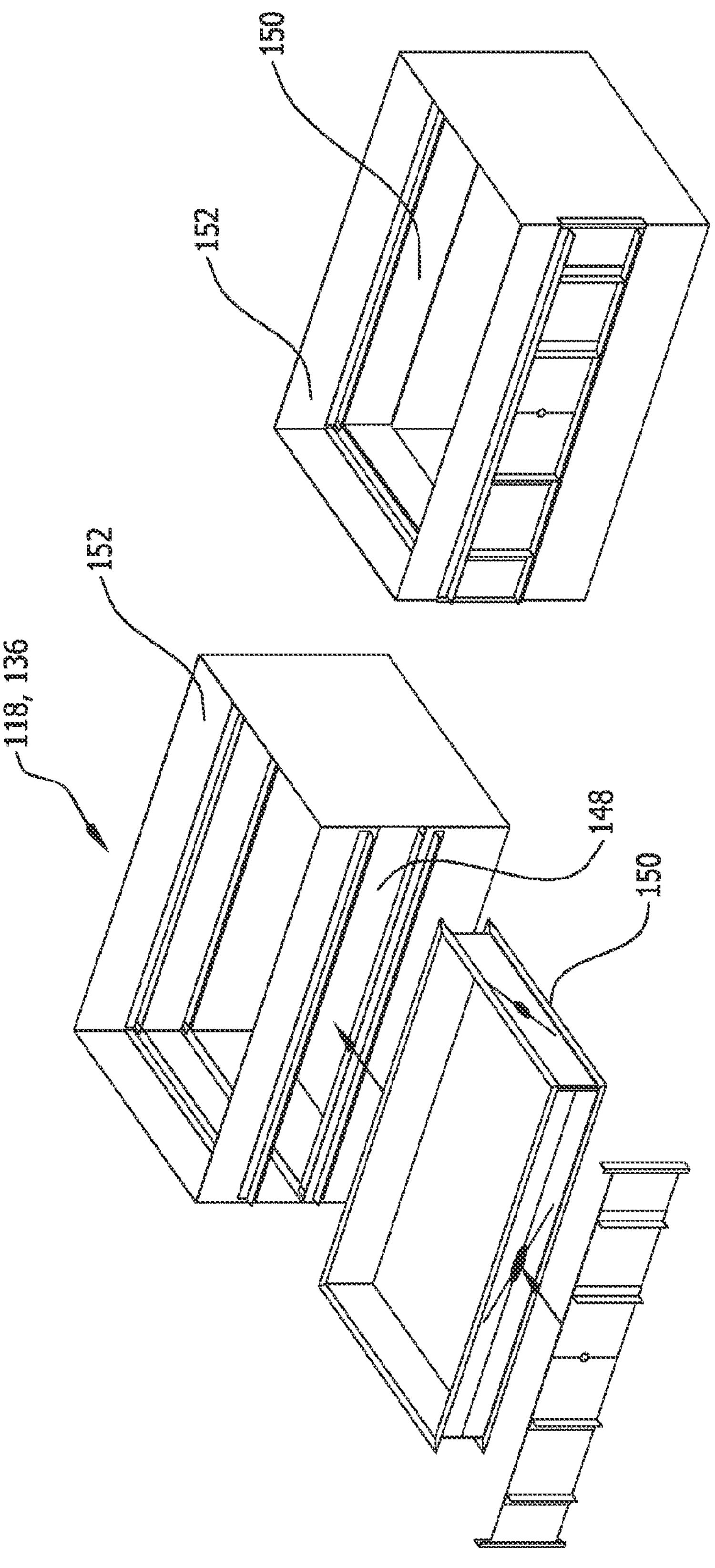
FIG. 15 is a portion of a ventilation tower of a feed air system or exhaust air system of the temperature treatment system from FIG. 8, a reinforcing structure being provided for reinforcement.

As can finally be seen in FIG. 15, it can be advantageous if a feed air channel 116 designed as a ventilation tower 118 and/or an exhaust air channel 134 designed as a ventilation tower 136 comprises an access opening 148, for example a flap. In particular a return channel 138 can be connected or maintenance access can be achieved as a result.

Since the access opening 148 could result in a structural weakening of the ventilation tower 118, 136, said tower is preferably provided with a reinforcing structure 150.

The reinforcing structure 150 is in particular a rectangular reinforcing ring or stiffening ring which can be pushed through the access opening 148 into the portion 152 of the ventilation tower 118, 136 having the access opening 148.

By means of the reinforcing structure 150, in particular an additional external stiffening or reinforcement or other support of the ventilation tower 118, 136 can thus be avoided, as a result of which the entire structure of the temperature treatment system 100 can be simplified.

Such a reinforcement of the ventilation tower 118, 136 can also be provided in other embodiments of the temperature treatment system 100, for example according to the first embodiment shown in FIG. 1 to 7.

Otherwise, the second embodiment of the temperature treatment system 100 shown in FIG. 8 to 15 corresponds in terms of structure and function to the first embodiment shown in FIG. 1 to 7, and therefore reference is made, in this respect, to the above description thereof.

Figure 16:
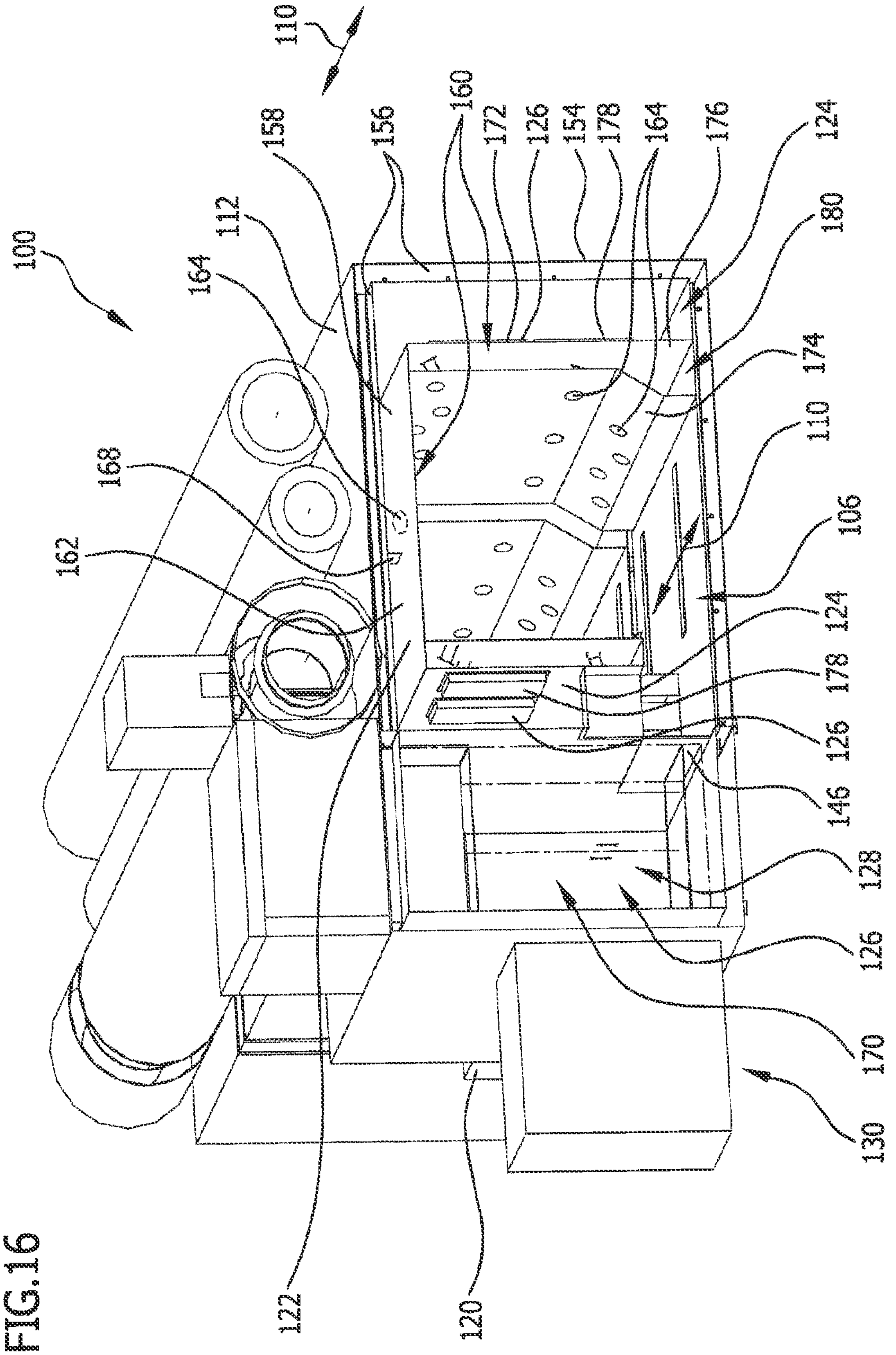
FIG. 16 is a schematic perspective vertical cross section through a third embodiment of a temperature treatment system.
Figure 17:
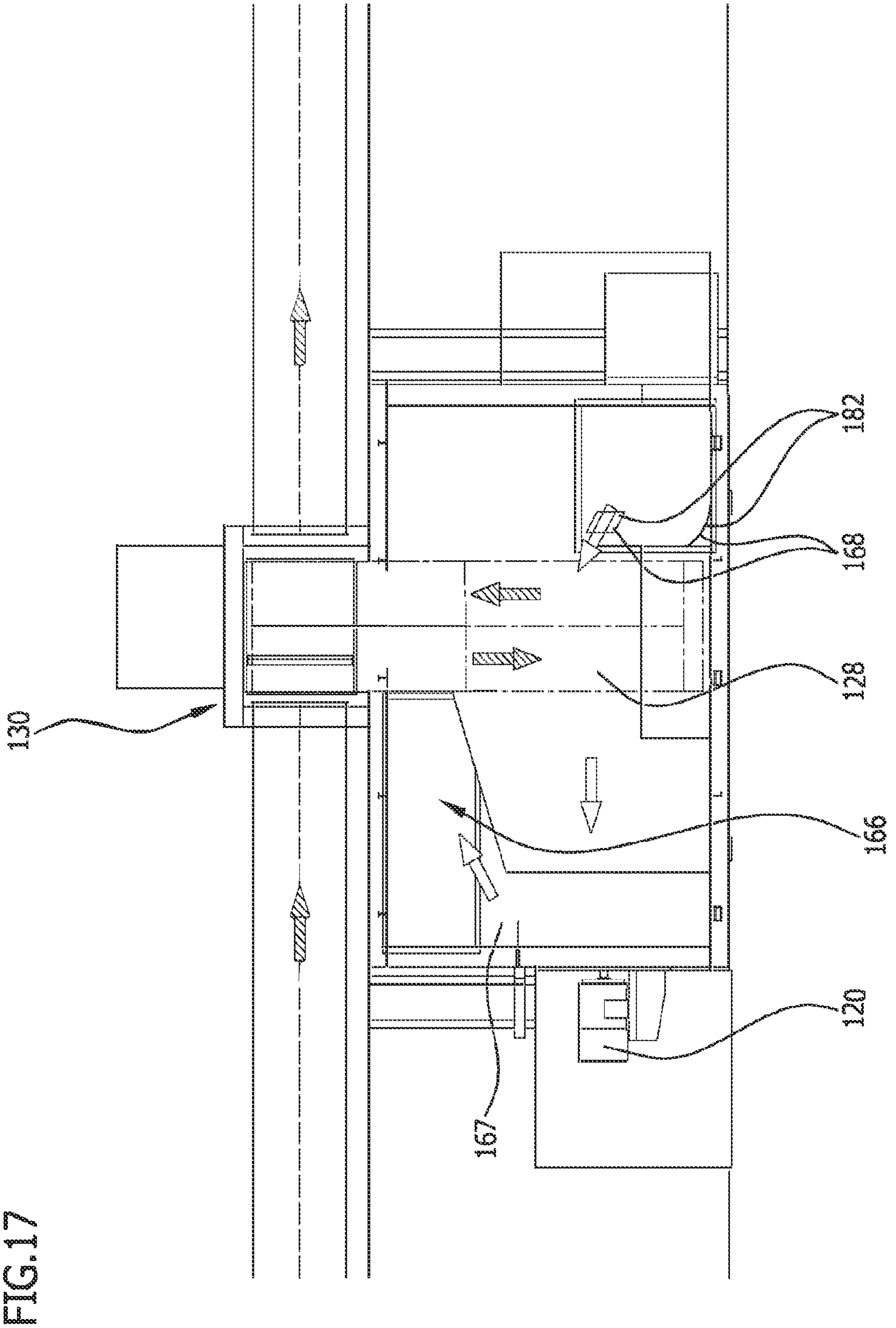
FIG. 17 is a schematic perspective vertical longitudinal section through an air circulation system of the temperature treatment system from FIG. 16 to illustrate the air flows.

A third embodiment of a temperature treatment system 100 shown in FIGS. 16 and 17 differs from the first embodiment shown in FIG. 1 to 7 substantially in that the distributor channels 122 are not arranged above the housing 112 of the temperature treatment system 100.

Rather, the distributor channels 122 in the third embodiment shown in FIGS. 16 and 17 are integrated into the housing 112.

The housing 112 comprises one or more outer walls 154, which are in particular provided with an insulation region 156 or form such an insulation region. As a result, a large temperature difference between the interior of the housing 112 and the surroundings thereof can be maintained with the lowest possible energy loss.

Preferably, both the outer wall 154 and the insulation regions 156 surround the temperature treatment chamber 106 completely or at least in portions, in particular on at least two sides or at least three sides, in cross section.

In the third embodiment of the temperature treatment system 100 shown in FIGS. 16 and 17, the function of the distributor channels 122 is achieved by a connection space 158.

The connection space 158 in particular interconnects the two pressure chambers 124 on either side of the temperature treatment chamber 106.

In this case, the connection space 158 preferably extends over an entire width of the temperature treatment chamber 106, above the temperature treatment chamber 106, in particular in a vertical projection of the temperature treatment chamber 106 up to the outer wall 154 and/or the insulation region 156.

A partition wall 160 separates the connection space 158 from the temperature treatment chamber 106.

This partition wall 160 is in particular designed as a non-insulated metal sheet or comprises such a metal sheet.

The partition wall 160 comprises in particular a ceiling partition wall 162 which delimits the temperature treatment chamber 106 at the top and separates it from the connection space 158.

In the ceiling partition wall 162, one or more inlet openings 164 may optionally be provided for supplying air to the temperature treatment chamber 106.

The connection space 158 preferably extends over a greater length along the conveying direction 110 than a feed opening 166 for supplying the air from the air circulation system 130 into the interior of the housing 112.

It can be advantageous if, as shown in FIG. 17, the feed opening 166 adjoins a feed channel 167, which connects the feed opening 166 to the fan 120 and widens upward in the direction of the feed opening 166 and/or counter to the direction of gravity. As a result of the widening configuration of the feed channel 167, a more uniform distribution of the air to the pressure chambers 124 can preferably take place.

With regard to an optimal distribution of the supplied air to both pressure chambers 124, one or more guide elements 168 are preferably provided. For example, one or more guide elements 168 can be arranged in the connection space 158 in order to distribute the air flow flowing into the connection space 158 along the conveying direction 110 and uniformly to both pressure chambers 124. As a result, an inflow onto the workpieces 102 in the temperature treatment chamber 106 that is uniform on both sides can preferably be achieved.

As can also be seen from FIG. 16, the temperature treatment system 100 preferably comprises at least one further filter stage 126 in addition to the filter stage 126 to be assigned to the air circulation system 130.

In particular, the filter stage 126 assigned to the air circulation system 130 is a coarse filter stage 170.

The further filter stage 126 is in particular a fine filter stage 172. Preferably, the further filter stage 126 is arranged in the interior of the housing 112, for example integrated into the partition wall 160.

For this purpose, the partition wall 160 comprises in particular a side partition wall 174 which faces the temperature treatment chamber 106, and a filter partition wall 176 assigned to the respective pressure chamber 124.

One or more receptacles for one or more filter elements, in particular filter mats 178, which form the filter stage 126, are arranged and/or formed in the filter partition wall 176.

A distributor space 180 is preferably formed between the filter partition wall 176 and the side partition wall 174 in order to be able to distribute the air flowing through the filter stage 126 uniformly to one or more inlet openings 164 in the side partition wall 174 and thus to enable a uniform supply of the air to the temperature treatment chamber 106.

Since the connection space 158 connects the two pressure chambers 124 to one another over a long length along the conveying direction 110, and thus allows a large channel cross section even at a low height, the entire temperature treatment system 100 can be of compact design. In addition, thermal insulation can preferably be optimized by the use of the connection space 158.

Finally, it can also be seen from FIG. 16 that the suction is carried out by means of the fan 120 in the base region 146, in order to remove air from the temperature treatment chamber 106 and finally to supply it to one or more heat exchangers 128 and/or one or more filter stages 126.

In particular when using the temperature treatment system 100 for heating workpieces 102, it can be provided that the air is strongly heated by means of one or more heat exchangers 128. A uniform inflow into the respective heat exchanger 128 is preferably ensured by means of one or more guide elements 168, in particular baffles 182.

In particular, different stages of guide elements 168 can be provided in this case, in order to distribute the air flowing in, for example from the base region 146, to the heat exchanger 128 uniformly in the vertical direction first, and then subsequently or simultaneously in the horizontal direction (see in particular FIG. 17).

As a result, uniform heating of the air circulated by means of an air circulation system 130, for example, can be achieved.

Otherwise, the third embodiment of the temperature treatment system 100 shown in FIGS. 16 and 17 corresponds in terms of structure and function to the first embodiment shown in FIG. 1 to 7, and therefore reference is made, in this respect, to the above description thereof.

In a further embodiment of a temperature treatment system 100 that is not shown, it can be provided that the connection space 158 is formed in multiple parts and in particular enables an air flow in both directions, perpendicularly to the conveying direction 110 and horizontally.

This can be advantageous in particular if a one-sided circulating air return suction is undesirable and a recirculation of air through the connection space 158 is thus also desired.

FIG. 18 shows a fourth embodiment of a temperature treatment system 100 which substantially corresponds to the third embodiment shown in FIGS. 16 and 17 but comprises two temperature treatment chambers 106 running parallel to one another.

It is also not apparent in FIG. 18 that a plurality of air circulation systems 130, which serve in particular for heating the air circulated in the temperature treatment chamber 106, are arranged on the mutually opposing outer walls 154 of the two temperature treatment chambers 106.

By using connection spaces 158 according to the third embodiment shown in FIGS. 16 and 17, such a double arrangement of temperature treatment chambers 106 can be made possible in a particularly compact space, in particular without the requirement that further components of a feed air system 114, an air circulation system 130 and/or an exhaust air system 132 have to be mounted between the temperature treatment chambers 106.

Otherwise, the fourth embodiment shown in FIG. 18 corresponds in terms of structure and function to the third embodiment shown in FIGS. 16 and 17, and therefore reference is made, in this respect, to the above description thereof.

The invention claimed is:

1. Temperature treatment system for carrying out a temperature treatment of workpieces, the temperature treatment system comprising:
- a temperature treatment chamber through which the workpieces can be conveyed along a conveying direction; and/or
- a feed air system for supplying feed air to the temperature treatment chamber; and/or
- an exhaust air system for discharging exhaust air from the temperature treatment chamber; and/or
- one or more air circulation systems for circulating at least some of the air guided in the temperature treatment chamber, wherein a pressure chamber is formed in each case on both sides of the temperature treatment chamber, via which pressure chamber the air can be introduced into the temperature treatment chamber, wherein the two pressure chambers are fluidically connected to one another by a connection channel and/or connection space, and wherein the connection channel and/or the connection space is arranged within a housing which surrounds the temperature treatment chamber.

2. Temperature treatment system according to claim 1, wherein the housing includes an outer wall which, at least in portions, forms or includes a thermal insulation region, wherein the connection channel and/or the connection space is arranged completely within an interior of the housing surrounded by the outer wall.

3. Temperature treatment system according to claim 1, wherein the connection channel and/or the connection space is delimited by an outer wall of the housing and/or by a partition wall delimiting the temperature treatment chamber.

4. Temperature treatment system according to claim 1, wherein the connection channel and/or the connection space has a length along the conveying direction which corresponds at least approximately to five times a height of the connection channel and/or the connection space.

5. Temperature treatment system according to claim 1, wherein the connection channel and/or the connection space has a width, taken in a horizontal direction and perpendicularly to the conveying direction, which corresponds at least approximately to four times a height of the connection channel and/or the connection space.

6. Temperature treatment system according to claim 1, wherein there is a partition wall,
- a) which separates the temperature treatment chamber from at least one of the pressure chambers and/or from the connection channel and/or the connection space, and/or
- b) which is formed in multiple parts and/or
- c) which includes the following:
- a ceiling partition wall separating the temperature treatment chamber from the connection channel and/or the connection space;
- one or more side partition walls which each separate a pressure chamber from the temperature treatment chamber and each have one or more inlet openings for supplying air from the respective pressure chamber to the temperature treatment chamber;
- one or more filter partition walls which each form a filter stage within the temperature treatment chamber and/or between a pressure chamber and the temperature treatment chamber; and
- one or more distributor spaces, each of which is arranged and/or formed between a filter partition wall and a side partition wall.

7. Temperature treatment system according to claim 1, wherein the connection channel and/or the connection space include one or more guide elements for influencing a flow within the connection channel and/or the connection space.

8. Temperature treatment system according to claim 7, wherein one or more guide elements extend at least approximately over an entire height of the connection channel and/or the connection space.

9. Temperature treatment system according to claim 1, wherein one or more of the one or more air circulation systems each include a heating device, by which at least some of the air guided in the temperature treatment chamber can be heated, the heating device preferably being or including a fuel-operated heating device and/or an electric heating device.

10. Temperature treatment system according to claim 9, wherein the heating device includes a burner heater and/or an electric heater, one or more of the one or more air circulation systems each being provided with a separate burner and/or a separate electric heater for directly or indirectly heating the air.

11. Temperature treatment system according to claim 9, wherein the heating device includes a heat exchanger by which heat can be transferred from a heat transfer medium to at least some of the air guided in the temperature treatment chamber.

12. Temperature treatment system according to claim 11, wherein the heat exchanger is a central heat exchanger, one or more of the one or more air circulation systems each being provided with a flap by which heating gas from the heat exchanger can be admixed to the air circulated by the respective air circulation system, in a controlled and/or regulated manner.

13. Temperature treatment system according to claim 1, wherein the one or more air circulation systems each include one or more fans and/or each comprise one or more heating devices and/or each include mutually independent channels and/or passages for connection to the temperature treatment chamber.

14. Temperature treatment system according to claim 1, wherein the one or more air circulation systems directly adjoin a housing wall of a housing of the temperature treatment chamber or are integrated into the housing of the temperature treatment chamber.

15. Temperature treatment system according to claim 1, wherein air from at least one temperature treatment chamber portion can be discharged from the temperature treatment chamber and can be fed to the same temperature treatment chamber portion(s) by one or more air circulation systems.

16. Temperature treatment system according to claim 1, wherein the temperature treatment system includes a conveying device, by which the workpieces can be conveyed through the temperature treatment chamber in a longitudinal orientation thereof.

17. Temperature treatment system according to claim 1, wherein the temperature treatment system comprises includes two temperature treatment chambers which extend parallel to one another, at least in portions, and to each of which is assigned one of a plurality of air circulation systems which are different from one another, a) wherein two housings surrounding the temperature treatment chambers directly adjoin one another and/or are formed at least in portions by the same walls, and/or b) wherein the air circulation system of each temperature treatment chamber is arranged on an outer side of the housing surrounding said temperature treatment chamber, said outer side being arranged facing away from the other housing.

* * * * *